(12) United States Patent
Kamizori et al.

(10) Patent No.: US 9,570,777 B2
(45) Date of Patent: Feb. 14, 2017

(54) LITHIUM SECONDARY BATTERY

(71) Applicants: HITACHI MAXELL, LTD., Ibaraki-shi, Osaka (JP); UBE INDUSTRIES, LTD., Ube-shi, Yamaguchi (JP)

(72) Inventors: Haruki Kamizori, Ibaraki (JP); Yusuke Nakamura, Ibaraki (JP); Itaru Gosho, Ibaraki (JP); Masayuki Yamada, Ibaraki (JP); Koji Abe, Ube (JP); Kei Shimamoto, Ube (JP)

(73) Assignees: HITACHI MAXELL, LTD., Ibaraki-shi (JP); UBE INDUSTRIES, LTD., Ube-shi (JP)

( * ) Notice: Subject to any disclaimer, the term of this patent is extended or adjusted under 35 U.S.C. 154(b) by 330 days.

(21) Appl. No.: 14/347,978

(22) PCT Filed: Sep. 28, 2012

(86) PCT No.: PCT/JP2012/075079
§ 371 (c)(1),
(2) Date: Mar. 27, 2014

(87) PCT Pub. No.: WO2013/047747
PCT Pub. Date: Apr. 4, 2013

(65) Prior Publication Data
US 2014/0234704 A1  Aug. 21, 2014

(30) Foreign Application Priority Data

Sep. 29, 2011 (JP) .................................. 2011-213747

(51) Int. Cl.
*H01M 10/0567* (2010.01)
*H01M 10/052* (2010.01)
*H01M 4/525* (2010.01)

(52) U.S. Cl.
CPC ......... *H01M 10/0567* (2013.01); *H01M 4/525* (2013.01); *H01M 10/052* (2013.01);
(Continued)

(58) Field of Classification Search
CPC ................................................ H01M 10/0567
See application file for complete search history.

(56) References Cited

U.S. PATENT DOCUMENTS 9,005,824 B2* 4/2015 Kawamoto ....... H01M 10/0567
429/337
2004/0013944 A1  1/2004  Lee et al.
(Continued)

FOREIGN PATENT DOCUMENTS

| CN | 101622751 A | 1/2010 |
|----|-------------|--------|
| CN | 101669236 A | 3/2010 |
| CN | 101790496 A | 7/2010 |
| JP | 2004-39642 A | 2/2004 |
| JP | 2006-202647 A | 8/2006 |
| JP | 2007-53083 A | 3/2007 |
| JP | 2007-165108 A | 6/2007 |
| JP | 2008-262908 A | 10/2008 |

(Continued)

OTHER PUBLICATIONS

International Search Report dated Dec. 25, 2012 issued in corresponding application No. PCT/JP2012/075079.

*Primary Examiner* — Maria J Laios
(74) *Attorney, Agent, or Firm* — Westerman, Hattori, Daniels & Adrian, LLP

(57) ABSTRACT

A lithium secondary battery of the present invention includes: a positive electrode; a negative electrode; a non-aqueous electrolytic solution; and a separator. The positive active material contains a lithium-containing composite oxide containing nickel. A molar ratio of a total nickel amount with respect to a total lithium amount contained in the entire positive active material is 0.05 to 1.0. The non-aqueous electrolytic solution contains 0.5 to 5.0 mass % of a phosphonoacetate-based compound represented by the following General Formula (1). In the Formula, $R^1$, $R^2$, and (Continued)

$R^3$ independently represent an alkyl group, an alkenyl group, or an alkynyl group having 1 to 12 carbon atoms, which may be substituted by a halogen atom, and "n" represents an integer of 0 to 6.

[Chem. 1]

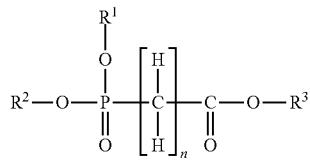

(1)

14 Claims, 2 Drawing Sheets

(52) U.S. Cl.
CPC .... *H01M 2300/0025* (2013.01); *Y02E 60/122* (2013.01); *Y02T 10/7011* (2013.01)

(56) References Cited

U.S. PATENT DOCUMENTS

| | | | |
|---|---|---|---|
| 2005/0008939 | A1 | 1/2005 | Ota et al. |
| 2007/0264577 | A1* | 11/2007 | Katayama ............. H01M 2/162 429/246 |
| 2008/0037060 | A1* | 2/2008 | Ono ................... H04N 1/00278 358/1.15 |
| 2009/0142663 | A1 | 6/2009 | Takeuchi et al. |
| 2009/0148771 | A1 | 6/2009 | Ishii et al. |
| 2010/0035147 | A1* | 2/2010 | Kotato ................ H01M 10/052 429/203 |
| 2010/0119949 | A1 | 5/2010 | Yano et al. |
| 2011/0059363 | A1 | 3/2011 | Imanari et al. |
| 2012/0156557 | A1 | 6/2012 | Kotato et al. |
| 2012/0264011 | A1 | 10/2012 | Kotato et al. |

FOREIGN PATENT DOCUMENTS

| | | |
|---|---|---|
| JP | 2009-70615 A | 4/2009 |
| JP | 2009-193744 A | 8/2009 |
| JP | 2011-187398 A | 9/2011 |
| WO | 2012/014998 A1 | 2/2012 |
| WO | 2012/141270 A1 | 10/2012 |

* cited by examiner

LITHIUM SECONDARY BATTERY

TECHNICAL FIELD

The present invention relates to a lithium secondary battery that is excellent in storage characteristics at high temperature and that has satisfactory charge and discharge cycle characteristics.

BACKGROUND ART

In recent years, along with the development of portable electronic equipment such as a mobile phone and a notebook personal computer, and the commercialization of electric automobiles, there is a demand for further enhancement of performance and stability of a secondary battery and a capacitor to be used as power sources for the above-mentioned equipment and electric automobiles. In particular, a lithium secondary battery is drawing attention as a battery having high energy density and is being improved from various viewpoints as a preferred power source for the above-mentioned equipment and electric automobiles.

In the above-mentioned lithium secondary battery, various improvements are still being made for the purpose of enhancing battery characteristics. For example, Patent Document 1 discloses a lithium secondary battery in which the gas generation amount is reduced and the storage characteristics at high temperature are rendered excellent by causing a nonaqueous electrolytic solution to contain a particular compound based on a phosphate ester.

Further, Patent Document 2 discloses a lithium secondary battery in which the swelling characteristics at high temperature are ameliorated by adding a phosphonate compound containing an unsaturated hydrocarbon radical to an electrolytic solution.

Further, lithium cobaltate ($LiCoO_2$) is easy to produce and handle, and hence is used frequently as a preferred positive active material for a lithium secondary battery. However, $LiCoO_2$ is produced using cobalt (Co) that is a rare metal as a raw material, and therefore, it is expected that resource shortage will become a serious problem. Further, the price of cobalt is high, and the price fluctuation thereof is large. Therefore, it is desired to develop a positive electrode material that can be supplied stably at low cost.

Under the above-mentioned circumstance, a positive active material replacing $LiCoO_2$ is being developed, and for example, Patent Document 3 discloses a positive active material containing nickel (Ni), manganese (Mn), cobalt (Co), and another substitution element M, in which a containing ratio of each element is defined, and an atomic ratio "a" of the substituent element M with respect to Mn, Ni, and Co on the surface of a positive active material particle is set to be larger than an average atomic ratio of the substituent element M with respect to Mn, Ni, and Co in the entire positive active material particle. The above-mentioned positive active material has a capacity higher than that of $LiCoO_2$, and in particular, the positive active material containing Ni has a high capacity in the vicinity of 3 to 4.2 V on the basis of a lithium metal. Thus, the positive active material containing Ni is a material capable of further increasing a battery capacity.

PRIOR ART DOCUMENTS

Patent Documents

Patent document 1: JP 2008-262908 A
Patent document 2: JP 2004-039642 A
Patent document 3: JP 2006-202647 A

DISCLOSURE OF INVENTION

Problem to be Solved by the Invention

However, when a lithium secondary battery is stored in a charged state, positive and negative active materials and an electrolytic solution react with each other to generate gas, which increases the internal pressure of a battery in some cases. The increase in internal pressure occurs conspicuously, in particular, when the lithium secondary battery is stored at temperature as high as 85° C. and the positive active material containing Ni is used as a positive electrode. In the case where a battery outer body is formed of an aluminum laminate film or a metallic can having a quadrangular prism structure, the outer body swells to be deformed in some cases due to the increase in internal pressure. Further, lithium as a resource is consumed in a side reaction such as the above-mentioned gas generation, and hence a battery capacity is reduced remarkably after the gas generation. Further, it is considered that Ni in the positive active material is unstable at high temperature; therefore, a side reaction product is also formed in addition to the gas generation and has an adverse effect of increasing an internal resistance of the lithium secondary battery, which also causes the battery capacity to decrease.

Further, it is also contemplated that an upper limit voltage is set in a high-voltage region, for example, a region of 4.3 V or more so as to increase a capacity. However, a high-voltage region has problems such as the decomposition of an electrolytic solution and the unstabilization of a positive active material (in particular, a Ni-based active material), which greatly influences cycle characteristics.

In view of the above-mentioned problems, it is an object of the present invention to provide a lithium secondary battery that is excellent in storage characteristics at high temperature, has satisfactory charge and discharge cycle characteristics, and can be used even under high voltage.

Means for Solving Problem

A lithium secondary battery of the present invention includes a positive electrode, a negative electrode, a non-aqueous electrolytic solution, and a separator. The positive electrode includes a collector and a positive electrode material mixture layer formed on the collector. The positive electrode material mixture layer includes a positive active material, a conductive agent, and a binder. The positive active material contains a lithium-containing composite oxide containing nickel. A molar ratio of a total nickel amount with respect to a total lithium amount contained in the entire positive active material is 0.05 to 1.0. The non-aqueous electrolytic solution contains 0.5 to 5.0 mass % of a phosphonoacetate-based compound represented by the following General Formula (1).

[Chem. 1]

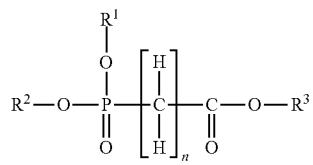

(1)

In the General Formula (1), $R^1$, $R^2$, and $R^3$ independently represent an alkyl group, an alkenyl group, or an alkynyl group having 1 to 12 carbon atoms, which may be substituted by a halogen atom, and "n" represents an integer of 0 to 6.

Effects of the Invention

According to the present invention, a lithium secondary battery that is excellent in storage characteristics at high temperature, has satisfactory charge and discharge cycle characteristics, and can be used even under high voltage.

DESCRIPTION OF THE INVENTION

Figure 1A:
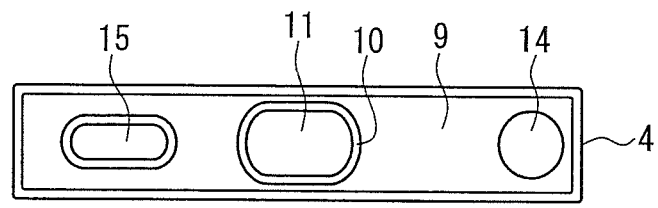
FIG. 1A is a plan view showing an example of a lithium secondary battery of the present invention.

Hereinafter, embodiments of the present invention are described. It should be noted that the embodiments are shown merely for illustrative purposes, and the present invention is not limited to the embodiments.

A lithium secondary battery of the present invention includes a positive electrode, a negative electrode, a nonaqueous electrolytic solution, and a separator. Further, the positive electrode includes a collector and a positive electrode material mixture layer formed on the collector. The positive electrode material mixture layer includes a positive active material, a conductive agent, and a binder. The positive active material contains a lithium-containing composite oxide containing nickel. A molar ratio of a total nickel amount with respect to a total lithium amount contained in the entire positive active material is 0.05 to 1.0. The nonaqueous electrolytic solution contains 0.5 to 5.0 mass % of a phosphonoacetate-based compound represented by the following General Formula (1):

[Chem. 2]

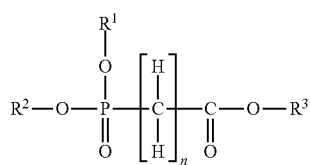
(1)

In the General Formula (1), $R^1$, $R^2$, and $R^3$ independently represent an alkyl group, an alkenyl group, or an alkynyl group having 1 to 12 carbon atoms, which may be substituted by a halogen atom, and "n" represents an integer of 0 to 6.

Nickel (Ni) contributes to an increase in battery capacity, and hence a battery capacity increases when the positive active material contains Ni. However, Ni lacks stability during storage at high temperature and under high voltage; therefore, a battery can be obtained which is stable during storage at high temperature and under high voltage by using an electrolytic solution containing a phosphonoacetate-based compound in addition to the positive active material containing Ni and setting a molar ratio of the total Ni amount with respect to the total Li amount to 0.05 to 1.0.

[Positive Electrode]

As a positive electrode in the lithium secondary battery of the present invention, for example, a positive electrode having a structure, in which a positive electrode material mixture layer containing a positive active material, a binder, and a conductive agent is formed on one surface or both surfaces of a collector, can be used.

<Positive Active Material>

A positive active material used in a positive electrode of the lithium secondary battery of the present invention contains at least a lithium (Li)-containing composite oxide containing nickel (Ni). Further, a molar ratio of the total Ni amount with respect to the total Li amount contained in the entire positive active material is set to 0.05 to 1.0.

The lithium-containing composite oxide containing Ni may contain, for example, cobalt (Co), manganese (Mn), titanium (Ti), chromium (Cr), iron (Fe), copper (Cu), silver (Ag), thallium (Tl), niobium (Nb), zirconium (Zr), and the like as transition metal elements other than Ni, and may contain elements other than the transition metal elements. Examples of the elements other than the transition metal elements include boron (B), phosphorus (P), zinc (Zn), aluminum (Al), calcium (Ca), strontium (Sr), barium (Ba), germanium (Ge), tin (Sn), and magnesium (Mg).

As described above, the positive active material containing Ni is advantageous for increasing a battery capacity because the positive active material containing Ni has a capacity in the vicinity of 3 to 4.2 V on the basis of a lithium metal higher than that of other lithium-containing composite oxides such as $LiCoO_2$. On the other hand, the positive active material containing Ni is highly reactive to an electrolytic solution, and hence leaves problems to be solved regarding an increase in internal pressure of a battery caused by gas generation (which influences how an outer body swells) and charge and discharge cycle characteristics (degree of capacity degradation per charge and discharge cycle). Then, it was found that the gas generation is reduced and the charge and discharge cycle characteristics are improved by setting a molar ratio of the total nickel amount with respect to the total lithium amount in the entire positive active material to at least 0.05 and at most 1.0, and further using a nonaqueous electrolytic solution containing 0.5 to 5.0 mass % of a phosphonoacetate-based compound described later.

As the lithium-containing composite oxide containing Ni to be used in the present invention, in particular, it is preferred to use a lithium-containing composite oxide represented by the following General Composition Formula (2), considering other characteristics of the positive active material such as stability and high-potential stability.

$$Li_{1+y}MO_2 \qquad (2)$$

In the General Composition Formula (2), "y" satisfies a relationship: $-0.15 \le y \le 0.15$, and "M" represents an element group including Ni, Co, and Mn, and the following relationships: $25 \le a \le 90$, $5 \le b \le 35$, $5 \le c \le 35$, and $10 \le b+c \le 70$ are satisfied, where a (mol %), b (mol %), and c (mol %) respectively represent a ratio of the number of elements of Ni, Co, and Mn included in the element group M with respect to the total number of elements included in the element group M.

When the total number of elements in the element group M in the General Composition Formula (2) representing the lithium-containing composite oxide is defined to be 100 mol %, a ratio "a" of Ni is preferably 25 mol % or more, more preferably 50 mol % or more, still more preferably 65 mol % or more from the viewpoint of increasing the capacity of the lithium-containing composite oxide. It should be noted that, when the ratio of Ni in the element group is too high, for example, the amounts of Co and Mn decrease, with the result that the effects of Co and Mn may be reduced.

Further, Co contributes to the capacity of the lithium-containing composite oxide and also acts on the enhancement of filling density in a positive electrode material mixture layer. On the other hand, when the amount of Co is too large, there is a risk that cost may rise and stability may decrease. Therefore, when the total number of elements of the element group M in the General Composition Formula (2) representing the lithium-containing composite oxide is defined to be 100 mol %, a ratio "b" of Co is preferably 5 mol % or more and 35 mol % or less.

Further, in the lithium-containing composite oxide, when the total number of elements in the element group M in the General Composition Formula (2) is defined to be 100 mol %, a ratio "c" of Mn is preferably 5 mol % or more and 35 mol % or less. The thermal stability of the lithium-containing composite oxide can be enhanced and a battery having higher safety can be configured by causing the lithium-containing composite oxide to contain Mn in the above-mentioned amount and causing Mn to be present in a crystal lattice without fail.

Further, the valence fluctuation of Mn involved in doping and de-doping of Li during charge and discharge of a battery can be suppressed, the average valence of Mn can be stably set to a value in the vicinity of a tetravalence, and the reversibility of charge and discharge can be further enhanced by causing the lithium-containing composite oxide to contain Co. Thus, a battery more excellent in charge and discharge cycle characteristics can be configured through use of the above-mentioned lithium-containing composite oxide.

Further, when the total number of elements in the element group M in the General Composition Formula (2) is defined to be 100 mol %, a sum (b+c) of the ratio "b" of Co and the ratio "c" of Mn is preferably 10 mol % or more and 70 mol % or less, more preferably 10 mol % or more and 50 mol % or less, from the viewpoint of satisfactorily ensuring the above-mentioned effects obtained by using both Co and Mn in the lithium-containing composite oxide.

The element group M in the General Composition Formula (2) representing the lithium-containing composite oxide may contain elements other than Ni, Co, and Mn, and examples of the elements other than Ni, Co, and Mn include titanium (Ti), chromium (Cr), iron (Fe), copper (Cu), zinc (Zn), aluminum (Al), germanium (Ge), tin (Sn), magnesium (Mg), silver (Ag), thallium (Tl), niobium (Nb), boron (B), phosphorus (P), zirconium (Zr), calcium (Ca), strontium (Sr), and barium (Ba). It should be noted that in order to sufficiently achieve the above-mentioned effects obtained by causing the lithium-containing composite oxide to contain Ni, Co, and Mn, a total "f" of ratios (mol %) of the elements other than Ni, Co, and Mn, when the total number of elements in the element group M is defined to be 100 mol %, is preferably 15 mol % or less, more preferably 3 mol % or less.

For example, when Al is caused to be present in a crystal lattice in the lithium-containing composite oxide, the crystal structure of the lithium-containing composite oxide can be stabilized and the thermal stability thereof can be enhanced. Therefore, a lithium secondary battery with higher safety can be configured. Further, the presence of Al in grain boundaries and on surfaces of particles of the lithium-containing composite oxide can maintain stability with the passage of time and suppress a side reaction between the lithium-containing composite oxide and an electrolytic solution, with the result that a lithium secondary battery with longer life can be configured.

It should be noted that Al cannot be involved in a charge and discharge capacity, and hence there is a risk that a capacity may decrease when the content of Al in the lithium-containing composite oxide is increased. Thus, when the total number of elements in the element group M is defined to be 100 mol % in the General Composition Formula (2) representing the lithium-containing composite oxide, a ratio of Al is preferably 10 mol % or less. In order to satisfactorily ensure the above-mentioned effects obtained by causing the lithium-containing composite oxide to contain Al, when the total number of elements in the element group M is defined to be 100 mol % in the General Composition Formula (2) representing the lithium-containing composite oxide, a ratio of Al is preferably 0.02 mol % or more.

When Mg is caused to be present in a crystal lattice in the lithium-containing composite oxide, the crystal structure of the lithium-containing composite oxide can be stabilized and the thermal stability thereof can be enhanced, with the result that a lithium secondary battery with higher safety can be configured. Further, when the lithium-containing composite oxide is subjected to phase transition due to doping and de-doping of Li during charge and discharge of a lithium secondary battery, Mg is dislocated to a Li site to alleviate an irreversible reaction, which can enhance the reversibility of a crystal structure of the lithium-containing composite oxide, with the result that a lithium secondary battery with longer charge and discharge cycle life can be configured. In particular, in the case where a lithium-containing composite oxide is formed as a Li-deficient crystal structure in the General Composition Formula (2) representing the lithium-containing composite oxide with y<0 being set, the lithium-containing composite oxide is formed in such a manner that Mg enters the Li site in place of Li to obtain a stable compound.

It should be noted that the interference of Mg with a charge and discharge capacity is small, and hence there is a risk that a capacity may decrease when the content of Mg in the lithium-containing composite oxide is increased. Therefore, when the total number of elements in the element group M is defined to be 100 mol % in the General Composition Formula (2) representing the lithium-containing composite oxide, a ratio of Mg is preferably 10 mol % or less. On the other hand, in order to satisfactorily ensure the above-mentioned effects obtained by causing the lithium-containing composite oxide to contain Mg, when the total number of elements in the element group M is defined to be 100 mol % in the General Composition Formula (2) representing the lithium-containing composite oxide, a ratio of Mg is preferably 0.02 mol % or more.

When the lithium-containing composite oxide is caused to contain Ti in particles, Ti is disposed in a defective part of a crystal caused by oxygen deficiency or the like to stabilize a crystal structure in a $LiNiO_2$ type crystal structure, and hence the reversibility of a reaction of the lithium-containing composite oxide is enhanced, with the result that a lithium secondary battery more excellent in charge and discharge cycle characteristics can be configured. In order to satisfactorily ensure the above-mentioned effects, when the total number of elements in the element group M is defined to be 100 mol % in the General Composition Formula (2) representing the lithium-containing composite oxide, a ratio of Ti is preferably 0.01 mol % or more, more preferably 0.1 mol % or more. It should be noted that when the content of Ti increases, there is a risk that a capacity is decreased because Ti is not involved in charge and discharge, and a heterogenous phase such as $Li_2TiO_3$ becomes likely to be formed, with the result that characteristics are degraded. Therefore, when the total number of elements in the element group M is defined to be 100 mol % in the General Composition Formula representing the lithium-containing composite oxide, a ratio of Ti is preferably 10 mol % or less, more preferably 5 mol % or less, still more preferably 2 mol % or less.

Further, it is preferred that the lithium-containing composite oxide contain at least one kind of element M' selected from Ge, Ca, Sr, Ba, B, Zr, and Ga as the element group M in the General Composition Formula (2) from the view point that the following effects can be ensured.

In the case where the lithium-containing composite oxide contains Ge, the crystal structure of the composite oxide after elimination of Li is stabilized. Therefore, the reversibility of a reaction during charge and discharge can be enhanced, with the result that a lithium secondary battery having higher safety and more excellent charge and discharge cycle characteristics can be configured. In particular, in the case where Ge is present on surfaces of particles or in grain boundaries of the lithium-containing composite oxide, the disturbance of the crystal structure during elimination and insertion of Li at an interface is suppressed, which can greatly contribute to the enhancement of charge and discharge cycle characteristics.

Further, in the case where the lithium-containing composite oxide contains an alkaline earth metal such as Ca, Sr, and Ba, the growth of primary particles is accelerated to enhance the crystallinity of the lithium-containing composite oxide. Therefore, active points of the lithium-containing composite oxide can be reduced, and the stability with the passage of time thereof is enhanced when the lithium-containing composite oxide is formed into a coating (composition containing a positive electrode material mixture described later) for forming a positive electrode material mixture layer, with the result that the irreversible reaction of the lithium-containing composite oxide with a nonaqueous electrolytic solution contained in a lithium secondary battery can be suppressed. Further, when these elements are present on surfaces of particles and in grain boundaries of the lithium-containing composite oxide, $CO_2$ gas in a battery can be trapped, which enables a lithium secondary battery to have a more excellent storage property and long life. In particular, in the case where the lithium-containing composite oxide contains Mn, there is a tendency that primary particles do not grow easily, and hence it is more effective to add an alkaline-earth metal such as Ca, Sr, and Ba.

In the case where the lithium-containing composite oxide contains boron (B), the growth of primary particles is also accelerated to enhance the crystallinity of the lithium-containing composite oxide. Therefore, active points of the lithium-containing composite oxide can be reduced, and the irreversible reaction of the lithium-containing composite oxide with moisture in the atmosphere, a binder used for forming a positive electrode material mixture layer, and a nonaqueous electrolytic solution contained in a battery can be suppressed. Therefore, the stability with the passage of time of the lithium-containing composite oxide is enhanced when it is formed into a coating for forming a positive electrode material mixture layer, and the generation of gas in a battery can be suppressed, with the result that a lithium secondary battery having a more excellent storage property and long life can be configured. In particular, in the case where the lithium-containing composite oxide contains Mn, there is a tendency that primary particles do not grow easily, and hence it is more effective to add B.

In the case where the lithium-containing composite oxide contains Zr, the presence of Zr in grain boundaries and surfaces of particles of the lithium-containing composite oxide suppresses the surface activity of the lithium-containing composite oxide without degrading the electrochemical characteristics thereof. Therefore, a lithium secondary battery having a more excellent storage property and long life can be configured.

In the case where the lithium-containing composite oxide contains Ga, the growth of primary particles is accelerated to enhance the crystallinity of the lithium-containing composite oxide. Therefore, the active points of the lithium-containing composite oxide can be reduced, and the stability with the passage of time of the lithium-containing composite oxide is enhanced when it is formed into a coating for forming a positive electrode material mixture layer, which can suppress the irreversible reaction of the lithium-containing composite oxide with a nonaqueous electrolytic solution. Further, by forming a solid solution of Ga in the crystal structure of the lithium-containing composite oxide, the layer interval of a crystal lattice is enlarged, and the ratio of expansion/contraction of the lattice by insertion and elimination of Li can be reduced. Therefore, the reversibility of the crystal structure can be enhanced, and a lithium secondary battery having a longer charge and discharge cycle life can be configured. In particular, in the case where the lithium-containing composite oxide contains Mn, there is a tendency that primary particles do not grow easily, and hence it is more effective to add Ga.

In order to make it easy to obtain the effects of an element M' selected from the above-mentioned Ge, Ca, Sr, Ba, B, Zr, and Ga, the ratio thereof is preferably 0.1 mol % or more in the entire elements of the element group M. Further, the ratio of the element M' in the entire elements of the element group M is preferably 10 mol % or less.

The elements other than Ni, Co, and Mn in the element group M may be distributed uniformly in the lithium-containing composite oxide, and further may be segregated on surfaces of particles or the like.

Further, in the case where a relationship between a ratio "b" of Co and a ratio "c" of Mn in the element group M is set to b>c in the General Composition Formula (2) representing the lithium-containing composite oxide, the growth of particles of the lithium-containing composite oxide is accelerated, and a lithium-containing composite oxide having high filling density at a positive electrode (positive electrode material mixture layer thereof) and higher reversibility can be obtained, and it can be expected that the capacity of a battery using such a positive electrode is further enhanced.

On the other hand, in the case where a relationship between the ratio "b" of Co and the ratio "c" of Mn in the element group M is set to b≤c in the General Composition Formula (2) representing the lithium-containing composite oxide, a lithium-containing composite oxide having higher thermal stability can be obtained, and it can be expected that the stability of a battery using the lithium-containing composite oxide is further enhanced.

A lithium-containing composite oxide having the above-mentioned composition has a true density of as large as 4.55 to 4.95 $g/cm^3$ and serves as a material having a high volume energy density. The true density of the lithium-containing composite oxide containing Mn in a predetermined range greatly varies depending on the composition thereof. However, the structure of the lithium-containing composite oxide is stabilized in the above-mentioned small composition range, and the uniformity thereof can be enhanced. Therefore, it is considered that the true density of the lithium-containing composite oxide containing Mn in a predetermined range has a large value close to that of the true density of $LiCoO_2$, for example. Further, the capacity per mass of the lithium-containing composite oxide can be increased, and hence a material excellent in reversibility can be obtained.

The true density of the lithium-containing composite oxide becomes larger, in particular, when the lithium-containing composite oxide has a composition close to a stoichiometric ratio. Specifically, in the General Composition Formula (2), it is preferred that $-0.15 \leq y \leq 0.15$ be satisfied, and the true density and the reversibility can be enhanced by adjusting the value of y in this manner. It is preferred that "y" be −0.05 or more and 0.05 or less, and in this case, the true density of the lithium-containing composite oxide can be set to a higher value of 4.6 $g/cm^3$ or more.

The lithium-containing composite oxide represented by the General Composition Formula (2) can be produced by mixing a Li-containing compound (lithium hydroxide • monohydrate, etc.), a Ni-containing compound (nickel sulfate, etc.), a Co-containing compound (cobalt sulfate, etc.), a Mn-containing compound (manganese sulfate, etc.), and a compound (aluminum sulfate, magnesium sulfate, etc.) containing the other elements contained in the element group M and firing the resultant mixture. Further, in order to synthesize the lithium-containing composite oxide with higher purity, it is preferred that a composite compound (hydroxide, oxide, etc.) containing a plurality of elements contained in the element group M and the Li-containing compound be mixed and fired.

The firing condition can be set to, for example, 1 to 24 hours at 800° C. to 1,050° C., and it is preferred that the mixture be heated temporarily to temperature (for example, 250° C. to 850° C.) lower than the firing temperature, the mixture be preliminarily heated by being kept at that temperature, and thereafter, the temperature be increased to the firing temperature to allow a reaction to proceed. The preliminary heating time is not particularly limited, and generally, it is appropriate that the preliminary heating time is set to about 0.5 to 30 hours. Further, the atmosphere during firing can be set to an atmosphere containing oxygen (that is, in the atmosphere), a mixed atmosphere of inactive gas (argon, helium, nitrogen, etc.) and oxygen gas, an atmosphere of oxygen gas, or the like. The oxygen concentration (based on a volume) in this case is preferably 15% or more, more preferably 18% or more.

Further, the positive active material may further contain another lithium-containing composite oxide containing any of transition metals other than Ni (hereinafter, which may be referred to as "second lithium-containing composite oxide"), besides the above-mentioned lithium-containing composite oxide containing Ni (hereinafter, which may be referred to as "first lithium-containing composite oxide"). Examples of the second lithium-containing composite oxide include a lithium cobalt oxide such as $LiCoO_2$; a lithium manganese oxide such as $LiMnO_2$ and $Li_2MnO_3$; a lithium-containing composite oxide having a spinel structure such as $LiMn_2O_4$ and $Li_{4/3}Ti_{5/3}O_4$; a lithium-containing composite oxide having an olivine structure such as $LiFePO_4$; an oxide in which part of constituent elements of a basic composition of the above-mentioned oxides is substituted by another element; and the like.

The positive active material may contain one kind or two or more kinds of the second lithium-containing composite oxide.

In the case of using the first lithium-containing composite oxide and the second lithium-containing composite oxide together for the positive active material, the lithium-containing composite oxide represented by the General Composition Formula (2) is particularly preferred as the first lithium-containing composite oxide, and it is particularly preferred to use $LiCoO_2$ as the second lithium-containing composite oxide.

Further, in the case of using the first lithium-containing composite oxide and the second lithium-containing composite oxide together for the positive active material, the content of the first lithium-containing composite oxide in the entire amount of the positive active material is preferably 10 mass % or more, more preferably 30 mass % or more from the viewpoint of satisfactorily ensuring the effects in the use of the first lithium-containing composite oxide. Further, in order to satisfactorily achieve the improvement effects of the storage characteristics at high temperature of the lithium secondary battery of the present invention and the charge and discharge cycle characteristics thereof, the content of the first lithium-containing composite oxide in the entire amount of the positive active material is preferably 80 mass % or less, more preferably 60 mass % or less.

Further, in the case of using the first lithium-containing composite oxide and the second lithium-containing composite oxide together for the positive active material, in order to obtain a lithium secondary battery that has a high capacity and is stable even during high-temperature storage, a molar ratio of the entire Ni amount with respect to the entire Li amount in the entire amount of the positive active material is 0.05 to 1.0 as described above, more preferably 0.15 to 1.0.

In the case of using the first lithium-containing composite oxide and the second lithium-containing composite oxide together for the positive active material, a molar ratio R of the entire Ni amount with respect to the entire Li amount in the entire amount of the positive active material can be calculated by the following Expression (3).

$$R = \Sigma N_j \times a_j / \Sigma L_i \times a_j \quad (3)$$

In the above-mentioned Formula (3), $N_j$ represents a molar composition ratio of Ni contained in a component j; $a_j$ represents a mixed mass ratio of the component j; and $L_j$ represents a molar composition ratio of Li contained in the component j.

For example, in the case of using $LiNi_{0.8}Co_{0.1}Mn_{0.1}O_2$ as the first lithium-containing composite oxide and $LiCoO_2$ as the second lithium-containing composite oxide together in a mass ratio of 1:1 (that is, each mixed mass ratio of the first lithium-containing composite oxide and the second lithium-containing composite oxide is 0.5), an entire molar ratio R is represented by the following expression.

$$R = (0.8 \times 0.5)/(1.0 \times 0.5 + 1.0 \times 0.5) = 0.4$$

Further, a lithium-containing composite oxide can be analyzed for a composition through use of an inductive coupled plasma (ICP) method as follows. First, 0.2 g of a lithium-containing composite oxide to be measured is collected and placed in a 100 mL container. Then, 5 mL of pure water, 2 mL of aqua regia, and 10 mL of pure water are added to the container successively. The resultant mixture is dissolved by heating. After the mixture is cooled, the mixture is further diluted by 25 times with pure water and is analyzed for a composition by a calibration curve method through use of an IPC analysis device "ICP-757" produced by Jarrelash Co., Japan. A composition formula can be derived from the obtained results.

An average particle diameter of the first lithium-containing composite oxide and the second lithium-containing composite oxide to be used in the present invention is preferably 5 to 25 μm, particularly preferably 10 to 20 μm. These particles may be secondary aggregate in which primary particles are aggregated, and an average particle diameter in this case refers to an average particle diameter of the secondary aggregate. Further, an average particle diameter of various particles as used herein is an average particle diameter D50% measured under the condition that these fine particles are dispersed in a medium that does not dissolve measurement particles, for example, through use of a laser scattering particle distribution analyzer "LA-920" produced by Horiba, Ltd. Further, it is preferred that a specific surface obtained by a BET method be 0.1 to 0.4 $m^2/g$ so that the reactivity with lithium ions is ensured and the side-reaction with an electrolytic solution is suppressed. The specific surface obtained by the BET method can be measured, for example, through use of a specific surface measurement device "Macsorb HM modele-1201" based on a nitrogen adsorption method produced by Mountech Co., Ltd.

<Conductive Agent for Positive Electrode Material Mixture Layer>

It is appropriate that a conductive agent to be used for a positive electrode material mixture layer is chemically stable in a battery. Examples of the conductive agent include graphite such as natural graphite and artificial graphite; carbon black such as acetylene black, Ketjen black (trade name), channel black, furnace black, lampblack, and thermal black; conductive fibers such as carbon fibers and metal fibers; metal powder such as aluminum powder; fluorocarbon; zinc oxide; a conductive whisker made of potassium titanate; a conductive metal oxide such as titanium oxide; and an organic conductive material such as a polyphenylene derivative. These conductive agents may be used alone or in combination with two or more kinds. Of those, graphite having high conductivity and carbon black excellent in a liquid absorbing property are preferred. Further, as the form of the conductive agent, not only primary particles but also a secondary aggregate or an assembly such as a chain structure can be used. Such an assembly is easy to handle and satisfies the productivity.

In particular, it is preferred that the positive electrode material mixture layer contain carbon fibers having an average fiber length of 10 nm or more and less than 1,000 nm and an average fiber diameter of 1 nm or more and 100 nm or less in an amount of 0.25 mass % or more and 1.5 mass % or less. When the positive electrode material mixture layer contains carbon fibers having an average fiber length of 10 nm or more and less than 1,000 nm and an average fiber diameter of 1 nm or more and 100 nm or less in an amount of 0.25 mass % or more and 1.5 mass % or less, the density of the positive electrode material mixture layer is increased to lead to a high capacity of a battery. Further, it was found that when the carbon fibers and the lithium-containing composite oxide containing Ni are used in combination, the swelling of a battery caused by the generation of gas can be suppressed, and charge and discharge cycle characteristics can be improved. The detailed reasons for the effects of increasing the density of the positive electrode material mixture layer and suppressing the reactivity of the positive electrode material mixture layer with an electrolytic solution are not known, but they are considered as follows. The carbon fibers of the above-mentioned size are likely to be dispersed satisfactorily in the positive electrode material mixture layer, and in particular, the surface of the lithium-containing composite oxide is covered with the carbon fibers. Further, the carbon fibers contain a great amount of fibers having short fiber length, and hence the distance between the positive active material particles becomes short, with the result that the positive electrode material mixture layer can be satisfactorily filled with each component. Further, when the carbon fibers serving as a conductive agent are dispersed satisfactorily, the reaction in the positive electrode material mixture layer is averaged as a whole. Therefore, the area of the positive electrode material mixture layer that is actually involved in the reaction increases to enhance load characteristics. In addition, the local reaction in the positive electrode material mixture layer is suppressed, and the degradation of the positive electrode during repeated charge and discharge is suppressed. Thus, the charge and discharge cycle characteristics are also enhanced, and further the reactivity of the positive electrode material mixture layer with an electrolytic solution is suppressed to reduce the generation of gas.

The average fiber length of the carbon fibers is preferably 30 nm or more and 500 nm or less. Further, the average fiber diameter of the carbon fibers is preferably 3 nm or more and 50 nm or less.

The average fiber length and average fiber diameter of the carbon fibers as used herein are those which are measured from TEM images captured at an acceleration voltage of 100 kV or 200 kV by a transmission electron microscope (TEM, for example, "JEM series" produced by JEOL Ltd., "H-700H" produced by Hitachi, Ltd., etc.). TEM images of 100 samples are captured at a magnification of 20,000 to 40,000 in the case of observing an average fiber length and 200,000 to 400,000 in the case of observing an average fiber diameter, and the length and diameter of each fiber are measured with a metal measure certified to be a first-grade by Japanese Industrial Standards (JIS). The measured values are averaged to obtain an average fiber length and an average fiber diameter.

Further, in the positive electrode material mixture layer, a conductive agent (hereinafter, which may be referred to as "another conductive agent") other than carbon fibers having an average fiber length of 10 nm or more and less than 1,000 nm and an average fiber diameter of 1 nm or more and 100 nm or less can be used, or the above-mentioned carbon fibers and another conductive agent described above can be used together. As another conductive agent described above, there are given conventionally known conductive agents that have been used for a positive electrode of a lithium secondary battery: for example, carbon materials. Examples of the carbon materials include graphite such as natural graphite (flaky graphite, etc.) and artificial graphite; carbon black such as acetylene black, Ketjen black, channel black, furnace black, lampblack, and thermal black; carbon fibers having an average fiber length of less than 1 nm or 1,000 nm or more, carbon fibers having an average fiber diameter of less than 1 nm or more than 100 nm.

In particular, it is preferred that the graphite be used together with the carbon fibers having an average fiber length of 10 nm or more and less than 1,000 nm and an average fiber diameter of 1 nm or more and 100 nm or less. In this case, the dispersibility of the carbon fibers in the positive electrode material mixture layer becomes more satisfactory, and the load characteristics and the charge and discharge cycle characteristics of a lithium secondary battery using the positive electrode according to the present invention can be further enhanced.

In the case where the carbon fibers and the graphite are used together, when the total content of the carbon fibers and the graphite in the positive electrode material mixture layer is defined to be 100 mass %, it is preferred that the content of the graphite be 25 mass % or more. By setting the contents in this manner, the above-mentioned effect obtained by using the carbon fibers and the graphite together can be ensured more satisfactorily. It should be noted that, when the amount of the graphite in the total amount of the carbon fibers and the graphite in the positive electrode material mixture layer is set too large, the amount of the conductive agent in the positive electrode material mixture layer becomes too large, which decreases the filling amount of the positive active material, with the result that there is a risk that the effect of increasing a capacity may be decreased. Thus, when the total content of the carbon fibers and the graphite in the positive electrode material mixture layer is defined to be 100 mass %, it is preferred that the content of the graphite be 87.5 mass % or less.

Further, in the case where two or more kinds are used as the conductive agent in the positive electrode material mixture layer, when the total amount of the carbon fibers and another conductive agent described above in the positive electrode material mixture layer is defined to be 100 mass %, it is also preferred that the content of another conductive agent described above be 25 to 87.5 mass %.

<Binder of Positive Electrode Material Mixture Layer>

As a binder to be used for the positive electrode material mixture layer, any of thermoplastic resin and thermosetting resin can be used as long as it is chemically stable in a battery. Of those, for example, a tetrafluoroethylene-vinylidenefluoride copolymer (hereinafter, referred to as "P (TFE-VDF)") other than a PVDF-based polymer is preferably used together with vinylidene polyfluoride (PVDF). The P(TFE-VDF) can serve to suppress the adhesiveness between the positive electrode material mixture layer and the collector appropriately.

Further, as the binder for the positive electrode material mixture layer, binders other than PVDF and P (TFE-VDF) can also be used alone or together with PVDF and P (TFE-VDF). Examples of the binders other than PVDF and P (TFE-VDF) include polyethylene, polypropylene, polytetrafluoroethylene (PTFE), polyhexafluoropropylene (PHFP), styrenebutadiene rubber, a tetrafluoroethylene-hexafluoroethylene copolymer, a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), a polychlorotrifluoroethylene (PCTFE), a propylene-tetrafluoroethylene copolymer, an ethylene-chlorotrifluoroethylene copolymer (ECTFE), or an ethylene-acrylic acid copolymer, an ethylene-methacrylic acid copolymer, an ethylene-methyl acrylate copolymer, an ethylene-methyl methacrylate copolymer, and Na ion cross-linked body of those copolymers.

In the case of using PVDF and P (TFE-VDF) and binders other than PVDF and P (TFE-VDF), it is preferred that the use amounts of the binders other than PVDF and P (TFE-VDF) in the positive electrode material mixture layer be 1 mass % or less in the total binder amount in the positive electrode material mixture layer.

The total content of the binders in the positive electrode material mixture layer is preferably 4 mass % or less, more preferably 3 mass % or less. When the amount of the binders in the positive electrode material mixture layer is too large, the adhesiveness between the positive electrode material mixture layer and the collector becomes too high, with the result that defects such as cracking are likely to occur in the positive electrode material mixture layer on an inner circumferential side of a wound electrode body using a positive electrode obtained as described above.

It is preferred to increase the content of the positive active material by reducing the amount of the binders in the positive electrode material mixture layer from the viewpoint of enhancing the capacity of the positive electrode. However, when the amount of the binders in the positive electrode material mixture layer is too small, the flexibility of the positive electrode material mixture layer is degraded, and the shape of a wound electrode body (in particular, the shape on an outer circumferential side) using a positive electrode thus produced is degraded, which may impair the productivity of a positive electrode, and further the productivity of a battery using the positive electrode. Thus, the total content of the binders in the positive electrode material mixture layer is set to 1 mass % or more, preferably 1.4 mass % or more.

Further, in the positive electrode material mixture layer, when the total of PVDF and P (TFE-VDF) is defined to be 100 mass %, the ratio of P (TFE-VDF) can be set to 10 mass % or more, preferably 20 mass % or more. Consequently, even when a positive electrode material mixture layer containing PVDF and a lithium-containing composite oxide containing Ni in a large ratio is formed, the adhesiveness between the positive electrode material mixture layer and the collector can be suppressed appropriately.

It should be noted that, when the amount of P (TFE-VDF) in the total of PVDF and P (TFE-VDF) is too large, the electrode adhesive strength is decreased to increase a battery resistance, which may cause a decrease in load characteristics of a battery. Thus, when the total of PVDF and P (TFE-VDF) in the positive electrode material mixture layer is defined to be 100 mass %, it is preferred that the ratio of P (TFE-VDF) be 30 mass % or less.

<Collector of Positive Electrode>

As a collector to be used in the positive electrode according to the present invention, collectors which are similar to those used for a positive electrode of a conventionally known lithium secondary battery can be used. For example, an aluminum foil having a thickness of 10 to 30 μm is preferred.

<Production Method of Positive Electrode>

The positive electrode can be produced, for example, through the following steps of preparing a paste-like or slurry-like composition containing a positive electrode material mixture in which the above-mentioned positive active material, binder, and conductive agent are dispersed in a solvent such as N-methyl-2-pyrrolidone (NMP) (it should be noted that the binder may be dissolved in the solvent); applying the composition to one surface or both surfaces of a collector; drying the composition; and subjecting the composition to a calendar treatment as needed. The production method of a positive electrode is not limited to the above-mentioned method, and a positive electrode can also be produced by another production method.

<Positive Electrode Material Mixture Layer>

As a composition of a positive electrode material mixture layer, for example, the amount of a positive active material is preferably 60 to 95 mass %; the amount of a binder is preferably 1 to 15 mass %; and the amount of a conductive agent is preferably 3 to 20 mass %.

Further, the thickness of the positive electrode material mixture layer after the calendar treatment is preferably 15 to 200 μm per surface of a collector. Further, after the calendar treatment, the density of the positive electrode material mixture layer is preferably 3.2 g/cm³ or more, more preferably 3.6 g/cm³ or more, still more preferably 3.7 g/cm³ or more. By forming a positive electrode including a positive electrode material mixture layer with such high density, the capacity can be further enhanced. It should be noted that, when the density of the positive electrode material mixture layer is too large, a porosity becomes small and there is a risk that the permeability of a nonaqueous electrolyte may be degraded. Therefore, the density of the positive electrode material mixture layer after the calendar treatment is preferably 4.2 g/cm³ or less. Further, as the calendar treatment, for example, roll pressing can be performed at a line pressure of about 1 to 30 kN/cm, and such a treatment enables a positive electrode material mixture layer with the above-mentioned density to be obtained.

Further, a density of the positive electrode material mixture layer as used herein refers to a value measured by the following method. A positive electrode is cut to a predetermined area. A mass of the cut area is measured through use of an electronic balance of a minimum scale value of 0.1 mg, and a mass of a collector is subtracted from the mass of the cut area to calculate a mass of a positive electrode material mixture layer. On the other hand, a total thickness of the positive electrode is measured at 10 points through use of a micrometer of a minimum scale value of 1 μm, and a volume of the positive electrode material mixture layer is calculated from an average value of values obtained by subtracting a thickness of the collector from the values measured at 10 points and the area of the positive electrode. Then, a density of the positive electrode material mixture layer is calculated by dividing the mass of the positive electrode material mixture layer by the volume thereof.

[Negative Electrode]

As a negative electrode in the lithium secondary battery of the present invention, for example, a negative electrode having a structure, in which a negative electrode material mixture layer containing a negative active material, a binder, and a conductive agent as needed is formed on one surface or both surfaces of a collector, can be used.

<Negative Active Material>

A negative active material used in the negative electrode of the lithium secondary battery of the present invention is not particularly limited as long as it is a negative active material used in a conventionally known lithium secondary battery, that is, a material capable of absorbing/desorbing lithium ions. One kind or a mixture of two or more kinds of carbon-based materials capable of absorbing/desorbing lithium ions can be used as the negative active material. Examples of the carbon-based materials include graphite, pyrolytic carbons, cokes, glassy carbons, a fired body of an organic polymer compound, mesocarbon microbeads (MCMB), and carbon fibers. Further, elements such as silicon (Si), tin (Sn), germanium (Ge), bismuth (Bi), antimony (Sb), and indium (In), and alloys thereof; a compound capable of being charged and discharged at low voltage close to a lithium metal such as a lithium-containing nitride or a lithium-containing oxide; or a lithium metal and a lithium/aluminum alloy can also be used as the negative active material. Of those, a material represented by $SiO_x$ containing silicon and oxygen as constituent elements and a composite of $SiO_x$ and a carbon material ($SiO_x$—C composite) are preferred as the negative active material. These $SiO_x$-based materials have a high capacity. Therefore, when the $SiO_x$-based material is combined with, for example, a lithium-containing composite oxide represented by the above-mentioned General Composition Formula (2) also having a high capacity, a battery having a high capacity can be provided. Further, it is more preferred that the above-mentioned $SiO_x$—C composite and a graphitic carbon material excellent in load characteristics and charge and discharge cycle characteristics be used together.

$SiO_x$ may contain a microcrystal or an amorphous phase of Si, and in this case, an atomic ratio between Si and O becomes a ratio including a microcrystal or an amorphous phase of Si. That is, $SiO_x$ includes a structure in which Si (for example, microcrystalline Si) is dispersed in an amorphous $SiO_2$ matrix, and it is appropriate that an atomic ratio "x" of amorphous $SiO_2$ combined with Si dispersed therein satisfies a relationship: $0.5 \leq x \leq 1.5$. For example, in the case of a material having a molar ratio of $SiO_2$ and Si of 1:1 in a structure in which Si is dispersed in an amorphous $SiO_2$ matrix, x is equal to 1. Therefore, the structural formula of that material is represented by SiO. In the case of the material having such a structure, a peak caused by the presence of Si (microcrystalline Si) may not be observed, for example, in X-ray diffraction analysis. However, when that material is observed with a transmission type electron microscope, the presence of fine Si can be confirmed.

$SiO_x$ is preferably a composite with a carbon material, and for example, it is desired that the surface of $SiO_x$ be covered with the carbon material. In general, the conductivity of $SiO_x$ is not sufficient. Therefore, when $SiO_x$ is used as the negative active material, it is necessary to form an excellent conductive network by using a conductive material (conductive agent) and rendering the mixing and dispersion between $SiO_x$ and the conductive material in a negative electrode satisfactory from the viewpoint of ensuring satisfactory battery characteristics. When a composite obtained by compositing $SiO_x$ with a carbon material is used, a conductive network in a negative electrode can be formed more satisfactorily, for example, compared with the case of using a material obtained merely by mixing $SiO_x$ with a conductive material such as a carbon material.

Examples of the composite of $SiO_x$ and a carbon material include granules of $SiO_x$ and a carbon material, in addition to $SiO_x$, whose surface is covered with a carbon material as described above.

Further, a more satisfactory conductive network can be formed in a negative electrode by further compositing the above-mentioned composite, in which the surface of $SiO_x$ is covered with a carbon material, with a conductive material (carbon material, etc.). Therefore, a lithium secondary battery having a higher capacity and being more excellent in battery characteristics (for example, charge and discharge cycle characteristics) can be realized. As a composite of $SiO_x$ covered with a carbon material and a carbon material, for example, there are given granules obtained by further granulating a mixture of $SiO_x$ covered with a carbon material and a carbon material.

Further, as $SiO_x$ whose surface is covered with a carbon material, a composite (for example, granules) of $SiO_x$ and a carbon material having a specific resistance smaller than that of $SiO_x$, the surface of the composite being further covered with a carbon material, can also be preferably used. When $SiO_x$ and the carbon material are dispersed in the granules, a more satisfactory conductive network can be formed. Therefore, battery characteristics such as heavy load discharge characteristics can be further enhanced in a nonaqueous secondary battery including a negative electrode containing $SiO_x$ as a negative active material.

Preferred examples of the above-mentioned carbon material to be used for forming a composite with $SiO_x$ include carbon materials such as low-crystalline carbon, carbon nanotube, and vapor-grown carbon fibers.

It is preferred that the carbon material be at least one kind of material selected from the group consisting of a fibrous or coiled carbon material, carbon black (including acetylene black, Ketjen black), artificial graphite, easily-graphitizable carbon, and hardly-graphitizable carbon. The fibrous or coiled carbon material is preferred in that this material forms a conductive network easily and has a large surface area. Carbon black (including acetylene black, Ketjen black), easily-graphitizable carbon, and hardly-graphitizable carbon are preferred in that they have high electric conductivity and a high liquid-retention property and further have a property of easily keeping in contact with $SiO_x$ particles even when the $SiO_x$ particles expand or contract.

A graphitic carbon material used together with $SiO_x$ as a negative active material can also be used as a carbon material for a composite of $SiO_x$ and a carbon material. The graphitic carbon material also has a high electric conductivity and a high liquid-retention property in the same way as in carbon black, and further has a property of easily keeping in contact with $SiO_x$ particles even when the $SiO_x$ particles expand or contract. Therefore, the graphitic carbon material can be used preferably for forming a composite with $SiO_x$.

Of the illustrated carbon materials, the fibrous carbon material is particularly preferably used in the case where a composite with $SiO_x$ is granules for the following reason. Due to the thin thread shape and high flexibility, the fibrous carbon material can follow the expansion/contraction of $SiO_x$ involved in charge and discharge of a battery. Further, the fibrous carbon material has large bulk density, and hence, can have a number of connection points with the $SiO_x$ particles. Examples of the fibrous carbon include polyacrylonitrile (PAN)-based carbon fibers, pitch-based carbon fibers, vapor deposition carbon fibers, and carbon nanotube. Any one of them may be used. The fibrous carbon material can also be formed on the surface of $SiO_x$ particles, for example, by a gas phase method.

$SiO_x$ generally has a specific resistance of $10^3$ to $10^7$ k$\Omega$cm, whereas the illustrated carbon material generally has a specific resistance of $10^{-5}$ to 10 k$\Omega$cm. Further, a composite of $SiO_x$ and a carbon material may further include a material layer (material layer containing hardly-graphitizable carbon) covering a carbon material covering layer on the surface of each particle.

In the case where a composite of $SiO_x$ and a carbon material is used for a negative electrode, a ratio of the carbon material be preferably 5 parts by mass or more, more preferably 10 parts by mass or more with respect to 100 parts by mass of $SiO_x$, from the viewpoint of allowing the function obtained by forming a composite with the carbon material to be exhibited satisfactorily. Further, in the composite, when a ratio of the carbon material that forms a composite with $SiO_x$ is too high, the amount of $SiO_x$ in a negative electrode material mixture layer decreases, which may degrade the effect of increased capacity. Therefore, a ratio of the carbon material is preferably 50 parts by mass or less, more preferably 40 parts by mass or less with respect to 100 parts by mass of $SiO_x$.

The above-mentioned composite of $SiO_x$ and a carbon material can be obtained, for example, by the following method.

First, a production method in the case of forming a composite of $SiO_x$ is described. A dispersion liquid, in which $SiO_x$ is dispersed in a dispersion medium, is prepared, and the dispersion liquid is sprayed and dried to produce composite particles containing a plurality of particles. As the dispersion medium, for example, ethanol can be used. The dispersion liquid is generally sprayed in an atmosphere of 50 to 300° C. Similar composite particles can also be produced by a granulation method based on a mechanical process using a vibration or planetary ball mill, rod mill, or the like besides the above-mentioned method.

In the case of producing granules of $SiO_x$ and a carbon material having a specific resistance smaller than that of $SiO_x$, it is appropriate that the carbon material is added to a dispersion liquid, in which $SiO_x$ is dispersed in a dispersion medium, and composite particles (granules) are formed through use of the dispersion liquid by a procedure similar to that in the case of compositing $SiO_x$. Further, granules of $SiO_x$ and a carbon material can also be produced by a granulation method based on a mechanical process similar to that described above.

Next, in the case of producing a composite by covering the surfaces of $SiO_x$ particles ($SiO_x$ composite particles or granules of $SiO_x$ and a carbon material) with a carbon material, for example, $SiO_x$ particles and hydrocarbon based gas are heated in a gas phase and carbon generated by thermal decomposition of the hydrocarbon based gas is deposited on the surfaces of the $SiO_x$ particles. Thus, according to a chemical vapor deposition (CVD) method, the hydrocarbon based gas spreads sufficiently to the composite particles, and a thin and uniform coating film (carbon material covering layer) containing a conductive carbon material can be formed on the surfaces of the particles and in the holes thereof. As a result, conductivity can be conferred on the $SiO_x$ particles uniformly with a small amount of carbon material.

In production of $SiO_x$ covered with a carbon material, the treatment temperature (ambient temperature) in the chemical vapor deposition (CVD) method is generally 600 to 1,200° C., in particular, preferably 700° C. or more, more preferably 800° C. or more, although it depends on the kind of hydrocarbon based gas. The reason for this is as follows: as the treatment temperature is higher, the amount of remaining impurities is smaller, and a covering layer containing highly conductive carbon can be formed.

As a liquid source of the above-mentioned hydrocarbon based gas, toluene, benzene, xylene, mesitylene, or the like can be used, and toluene that is easy to handle is particularly preferred. Hydrocarbon based gas can be obtained by vaporizing any of these sources (for example, causing bubbling with nitrogen gas). Further, methane gas, acetylene gas, or the like can also be used.

Alternatively, the following may be performed. The surfaces of $SiO_x$ particles ($SiO_x$ composite particles or granules of $SiO_x$ and a carbon material) are covered with a carbon material by the chemical vapor deposition (CVD) method. After that, at least one kind of an organic compound selected from the group consisting of a petroleum pitch, a coal-based pitch, a thermosetting resin, and a condensate of a naphthalenesulfonate and aldehydes is caused to adhere to a covering layer containing the carbon material, and then, the particles to which the organic compound has adhered are fired.

Specifically, a dispersion liquid, in which $SiO_x$ particles ($SiO_x$ composite particles or granules of $SiO_x$ and a carbon material) covered with a carbon material and the above-mentioned organic compound are dispersed in a dispersion medium, is prepared. The dispersion liquid is sprayed and dried to form particles covered with the organic compound, and the particles covered with the organic compound are fired.

As the above-mentioned pitch, an isotropic pitch can be used. As the thermosetting resin, a phenol resin, a furan resin, a furfural resin, or the like can be used. As the condensate of a naphthalenesulfonate and aldehydes, a formaldehyde naphthalenesulfonate condensate can be used.

As the dispersion medium for dispersing $SiO_x$ particles covered with a carbon material and the above-mentioned organic compound, for example, water or alcohols (ethanol, etc.) can be used. It is appropriate that the dispersion liquid is generally sprayed in an atmosphere of 50 to 300° C. The firing temperature is generally 600 to 1,200° C., and in particular, the firing temperature is preferably 700° C. or more, more preferably 800° C. or more. The reason for this is as follows: as the treatment temperature is higher, the amount of remaining impurities is smaller, and a covering layer containing a highly conductive carbon material of good quality can be formed. It should be noted that the treatment temperature is required to be a melting point of $SiO_x$ or less.

Examples of the graphitic carbon material to be used as a negative active material together with the above-mentioned composite of $SiO_x$ and a carbon material include natural graphite such as scalelike graphite, and artificial graphite obtained by graphitizing easily-graphitizable carbon such as pyrolytic carbons, MCMB, and carbon fibers at 2,800° C. or more.

In the negative electrode according to the present invention, a content of the composite of $SiO_x$ and a carbon material in the negative active material is preferably 0.01 mass % or more, more preferably 1 mass % or more, still more preferably 3 mass % or more, from the viewpoint of satisfactorily ensuring the effect of achieving a high capacity by using $SiO_x$. Further, from the viewpoint of satisfactorily avoiding a problem caused by a change in volume of $SiO_x$ involved in charge and discharge, a content of the composite of $SiO_x$ and a carbon material in the negative active material is preferably 20 mass % or less, more preferably 15 mass % or less.

<Binder of Negative Electrode Material Mixture Layer>

Examples of a binder to be used in the negative electrode material mixture layer include polysaccharides such as starch, polyvinyl alcohol, polyacrylic acid, carboxymethyl cellulose (CMC), hydroxypropyl cellulose, regenerated cellulose, and diacetyl cellulose, and modified products thereof; thermoplastic resins such as polyvinylchloride, polyvinylpyrrolidone, polytetrafluoroethylene, polyvinylidene fluoride, polyethylene, polypropylene, polyamide imide, and polyamide, and modified products thereof, polyimide; and polymers having rubber-like elasticity such as an ethylene-propylene-dienta-polymer (EPDM), sulfonated EPDM, styrene butadiene rubber (SBR), butadiene rubber, polybutadiene, fluorocarbon rubber, and polyethylene oxide and modified products thereof. Those binders can be used alone or in combination with two or more kinds.

<Conductive Agent of Negative Electrode Material Mixture Layer>

A conductive material serving as a conductive agent may further be added to the negative electrode material mixture layer. Such a conductive material is not particularly limited as long as it does not effect a chemical change in a battery. For example, materials such as carbon black (thermal black, furnace black, channel black, Ketjen black, acetylene black, etc.), carbon fibers, metal powder (powder made of copper, nickel, aluminum, silver, or the like), metal fibers, and a polyphenylene derivative (as described in JP 59 (1984)-20971 A) can be used alone or in combination with two or more kinds. Of those, carbon black is preferably used, and Ketjen black or acetylene black is more preferably used.

A particle diameter of the carbon material to be used as a conductive agent is an average particle diameter (D50%) measured by dispersing fine particles of the carbon material in a medium, for example, by a method similar to that for obtaining an average fiber length described above or through use of a laser scattering particle distribution analyzer (for example, "LA-920" produced by Horiba, Ltd.), and is preferably 0.01 μm or more, more preferably 0.02 μm or more and preferably 10 μm or less, more preferably 5 μm or less.

<Collector of Negative Electrode>

As a collector to be used in the negative electrode, a foil, a perforated metal, a net, an expanded metal made of copper or nickel, or the like can be used. In general, a copper foil is used. In the case where the entire thickness of a negative electrode is set to be thin so as to obtain a battery with high energy density, the upper limit of thickness of the negative electrode collector is preferably 30 μm, and the lower limit of thickness thereof is desirably 5 μm so as to ensure mechanical strength.

<Production Method of Negative Electrode>

A negative electrode is produced, for example, through the following steps of preparing a paste-like or slurry-like composition containing a negative electrode material mixture in which the above-mentioned negative active material, binder, and conductive agent as needed are dispersed in a solvent such as N-methyl-2-pyrrolidone (NMP) or water (it should be noted that the binder may be dissolved in the solvent); applying the composition to one surface or both surfaces of a collector; drying the composition; and subjecting the composition to a calendar treatment as needed. The production method of a negative electrode is not limited to the above-mentioned method, and a negative electrode can also be produced by another production method.

<Negative Electrode Material Mixture Layer>

In a negative electrode material mixture layer, it is preferred that the total amount of a negative active material be 80 to 99 mass % and the amount of a binder be 1 to 20 mass %. Further, in the case of using conductive materials separately as a conductive agent, it is preferred that the conductive materials in the negative electrode material mixture layer be used so that the total amount of the negative active material and the amount of the binder satisfy the above-mentioned preferred values. It is preferred that the thickness of the negative electrode material mixture layer be, for example, 10 to 100 μm.

[Nonaqueous Electrolytic Solution]

As a nonaqueous electrolytic solution in the lithium secondary battery of the present invention, a solution is used, in which a lithium salt is dissolved in an organic solvent and which contains a phosphonoacetate-based compound satisfying the General Formula (1).

[Chem. 3]

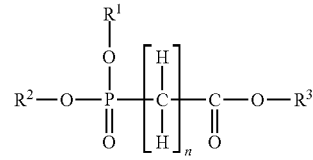

(1)

In the General Formula (1), $R^1$, $R^2$, and $R^3$ independently represent an alkyl group, an alkenyl group, or an alkynyl group having 1 to 12 carbon atoms, which may be substituted by a halogen atom, and "n" represents an integer of 0 to 6.

Examples of the phosphonoacetate-based compound include the following compounds.

<Compound where n=0 in the General Formula (1)>

Trimethyl phosphonoformate, methyl diethylphosphonoformate, methyl dipropylphosphonoformate, methyl dibutylphosphonoformate, triethyl phosphonoformate, ethyl dimethylphosphonoformate, ethyl dipropylphosphonoformate, ethyl dibutylphosphonoformate, tripropyl phosphonoformate, propyl dimethylphosphonoformate, propyl diethylphosphonoformate, propyl dibutylphosphonoformate, tributyl phosphonoformate, butyl dimethylphosphonoformate, butyl diethylphosphonoformate, butyl dipropylphosphonoformate, methyl bis(2,2,2-trifluoroethyl)phosphonoformate, ethyl bis(2,2,2-trifluoroethyl)phosphonoformate, propyl bis(2,2,2-trifluoroethyl)phosphonoformate, butyl bis(2,2,2-trifluoroethyl)phosphonoformate, etc.

<Compound where n=1 in the General Formula (1)>

Trimethyl phosphonoacetate, methyl diethylphosphonoacetate, methyl dipropylphosphonoacetate, methyl dibutylphosphonoacetate, triethyl phosphonoacetate, ethyl dimethylphosphonoacetate, ethyl dipropylphosphonoacetate, ethyl dibutylphosphonoacetate, tripropyl phosphonoacetate, propyl dimethylphosphonoacetate, propyl diethylphosphonoacetate, propyl dibutylphosphonoacetate, tributyl phosphonoacetate, butyl dimethylphosphonoacetate, butyl diethylphosphonoacetate, butyl dipropylphosphonoacetate, methyl bis(2,2,2-trifluoroethyl)phosphonoacetate, ethyl bis(2,2,2-trifluoroethyl) phosphonoacetate, propyl bis(2,2,2-trifluoroethyl)phosphonoacetate, butyl bis(2,2,2-trifluoroethyl) phosphonoacetate, allyl dimethylphosphonoacetate, allyl diethylphosphonoacetate, 2-propynyl dimethylphosphonoacetate, 2-propynyl diethylphosphonoacetate, etc.

<Compound where n=2 in the General Formula (1)>

Trimethyl 3-phosphonopropionate, methyl 3-(diethylphosphono)propionate, methyl 3-(dipropylphosphono)propionate, methyl 3-(dibutylphosphono)propionate, triethyl 3-phosphonopropionate, ethyl 3-(dimethylphosphono)propionate, ethyl 3-(dipropylphosphono)propionate, ethyl 3-(dibutylphosphono)propionate, tripropyl 3-phosphonopropionate, propyl 34-dimethylphosphono)propionate, propyl 3-(diethylphosphono)propionate, propyl 3-(dibutylphosphono)propionate, tributyl 3-phosphonopropionate, butyl 3-(dimethylphosphono)propionate, butyl 3-(diethylphosphono)propionate, butyl 3-(dipropylphosphono)propionate, methyl 3-(bis(2,2,2-trifluoroethyl)phosphono)propionate, ethyl 3(bis(2,2,2-trifluoroethyl) phosphono) propionate, propyl 3-(bis(2,2,2-trifluoroethyl)phosphono) propionate, butyl 3-(bis(2,2,2-trifluoroethyl)phosphono) propionate, etc.

<Compound where n=3 in the General Formula (1)>

Trimethyl 4-phosphonobutylate, methyl 4-(diethylphosphono)butylate, methyl 4-(dipropylphosphono)butylate, methyl 4-(dibutylphosphono)butylate, triethyl 4-phosphonobutylate, ethyl 4-(dimethylphosphono)butylate, ethyl 4-(dipropylphosphono)butylate, ethyl 4-(dibutylphosphono)butylate, tripropyl 4-phosphonobutylate, propyl 4-(dimethylphosphono)butylate, propyl 4-(diethylphosphono)butylate, propyl 4-(dibutylphosphono)butylate, tributyl 4-phosphonobutylate, butyl 4-(dimethylphosphono) butylate, butyl 4-(diethylphosphono)butylate, butyl 4-(dipropylphosphono)butylate, etc.

In general, additives have been added as needed to the nonaqueous electrolytic solution to be used in a battery in accordance with intended characteristics. For example, additives (including derivatives of the following exemplary additives) such as vinylene carbonate, fluoroethylene carbonate, an acid anhydride, a sulfonate, dinitryl, 1,3-propanesultone, diphenyldisulfide, cyclohexylbenzene, biphenyl, fluorobenzene, t-butylbenzene, and succinonitrile are added as needed to the nonaqueous electrolytic solution, for example, so as to enhance charge and discharge cycle characteristics and enhance safety by suppressing high-temperature swelling and preventing overcharge.

As described above, when a lithium-containing composite oxide containing Ni is used as a positive active material, a battery swells more during high-temperature storage or under high voltage, compared with the case where only $LiCoO_2$ is used as a positive active material. The reason for this is considered as follows: Ni is unstable at high temperature and under high voltage, and hence the reactivity between Ni in a highly charged state and a solvent or an additive is high, with the result that Ni is likely to become an active point. Therefore, due to the excess reaction between the active point of Ni and the solvent or additive, excess gas is generated to swell a battery, or a reaction product is accumulated at an Ni interface to increase electric resistance, which causes a problem of great degradation in capacity recovery ratio after high-temperature storage. Therefore, as countermeasures against the foregoing problem, it is required to add additives such as 1,3-propanesultone and succinonitrile to an electrolytic solution to suppress the above-mentioned excess reaction.

However, the conventional additives degrade charge and discharge cycle characteristics in most cases although they can improve a high-temperature storage property and suppress the swelling of a battery. The reason for this is considered as follows: the conventional additives such as 1,3-propanesultone and succinonitrile react with points other than an active point of a positive active material, and a reaction product is accumulated, which leads to a decrease in capacity and an increase in resistance.

The inventors of the present invention found the following: when a lithium-containing composite oxide containing Ni is used as a positive active material, and a nonaqueous electrolytic solution contains a phosphonoacetate-based compound, a high-temperature storage property is improved and the swelling of a battery is suppressed without charge and discharge cycle characteristics being degraded. The reason for this is not clear, but it is presumed that the phosphonoacetate-based compound covers mainly an active point of Ni, which reacts with an electrolytic solution to generate, thereby inactivating the active point of Ni.

Further, the phosphonoacetate-based compound also forms a coating film on a negative electrode during initial charge and discharge after battery production. However, the coating film formed of the phosphonoacetate-based compound has a high heat stability and a small resistance, and hence is unlikely to be decomposed even during high-temperature storage, with the result that an increase in resistance is suppressed. The reason for this effect is not clear, but this effect is observed conspicuously in particular when a negative active material contains a material containing Si and O as constituent elements.

It is presumed that, in the case where any of $R^1$, $R^2$, and $R^3$ in the General Formula (1) representing the above-mentioned phosphonoacetate-based compound contains an unsaturated bond, a carbon-carbon double bond or a carbon-carbon triple bond is opened and polymerized to form a coating film on the surface of a negative electrode. The coating film to be formed in this case is highly flexible because constituent molecules (constituent polymer) contain a flexible carbon-carbon bond as a main chain. When a lithium secondary battery is charged and discharged, a negative active material expands or contracts, and hence an entire negative electrode (negative electrode material mixture layer) also changes in volume. However, in the case where a coating film derived from a phosphonoacetate-based compound is formed on the surface of a negative electrode (negative electrode material mixture layer), the coating film is unlikely to be broken or cracked as a result of a change in volume of the negative electrode involved in charge and discharge of a battery because the coating film is highly flexible as described above. Therefore, the above-mentioned effect of the coating film derived from a phosphonoacetate-based compound can be maintained satisfactorily even when the battery is charged and discharged repeatedly.

Further, in recent years, there is a case where a battery voltage itself is increased for the purpose of increasing a battery capacity. When a charge voltage of a battery is increased, charge and discharge cycle characteristics tend to be degraded. However, it was found that, for the above-mentioned reason, even if a battery voltage is increased, the degradation of charge and discharge cycle characteristics can be further suppressed in the case where any of the above-mentioned $R^1$, $R^2$, and $R^3$ contains an unsaturated bond. It was also found that the above-mentioned effect becomes conspicuous, in particular, when the $R^3$ contains an unsaturated bond.

Thus, even when the content of Ni in the positive electrode is increased and a battery voltage is increased, excellent storage characteristics at high temperature can be obtained and degradation in charge and discharge cycle characteristics can be suppressed by adding a phosphonoacetate-based compound to a nonaqueous electrolytic solution.

In the lithium secondary battery of the present invention, those phosphonoacetate-based compounds are contained in a nonaqueous electrolytic solution (nonaqueous electrolytic solution to be used for assembling a battery, which is also applied hereinafter) in an amount of 0.5 mass % or more, preferably 1 mass % or more. When the content of the phosphonoacetate-based compound is too small, an active point of Ni cannot be covered sufficiently although the effect of suppressing the generation of gas is recognized, and hence the swelling of a battery cannot be suppressed. It should be noted that, when the content of the phosphonoacetate-based compound in the electrolytic solution is too large, the phosphonoacetate-based compound effects a reaction at points other than the active point of a positive electrode material, which involves increasing resistance in the same way as in the other additives. Therefore, the content of the phosphonoacetate-based compound is set to 5.0 mass % or less, preferably 3.0 mass % or less.

Further, the above-mentioned conventional additives (including the derivatives of the following examples) such as vinylene carbonate, fluoroethylene carbonate, an acid anhydride, a sulfonate, dinitryl, 1,3-propanesultone, diphenyldisulfide, cyclohexylbenzene, biphenyl, fluorobenzene, and t-butylbenzene may be used together as needed in accordance with the intended battery characteristics.

In particular, it is preferred that an electrolytic solution of the lithium secondary battery of the present invention further contains halogen-substituted cyclic carbonate such as fluoroethylene carbonate (FEC) and vinylene carbonate (VC).

As the halogen-substituted cyclic carbonate, a compound represented by the following General Formula (4) can be used.

[Chem. 4]

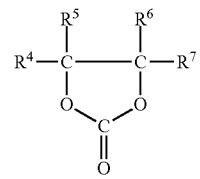

(4)

In the General Formula (4), $R^4$, $R^5$, $R^6$, and $R^7$ represent hydrogen, a halogen element, or an alkyl group having 1 to 10 carbon atoms; a part or a whole of hydrogen of the alkyl group may be substituted by a halogen element; at least one of $R^4$, $R^5$, $R^6$, and $R^7$ is a halogen element; and $R^4$, $R^5$, $R^6$, and $R^7$ may be respectively different from each other or two or more of them may be the same. In the case where $R^4$, $R^5$, $R^6$, and $R^7$ are alkyl groups, it is preferred that the number of carbons thereof be as small as possible. As the above-mentioned halogen element, fluorine is particularly preferred.

Of the halogen-substituted cyclic carbonate, 4-fluoro-1, 3-dioxolane-2-one (FEC) is particularly preferred.

From the viewpoint of ensuring the effects of the halogen-substituted cyclic carbonate and the VC satisfactorily, each content of the halogen-substituted cyclic carbonate and the VC in the nonaqueous electrolytic solution to be used in a battery (nonaqueous electrolytic solution to be used for assembling a battery, which is also applied hereinafter) is as follows: the content of the halogen-substituted cyclic carbonate is preferably 1 mass % or more and 1.5 mass % or less, and the content of the VC is preferably 1 mass % or more and 1.5 mass % or less. On the other hand, in the case where the amounts of the halogen-substituted cyclic carbonate and the VC in the nonaqueous electrolytic solution are too large, when a negative active material contains $SiO_x$, there is a risk that the activity of $SiO_x$ is degraded or excess gas is generated during formation of a coating film to cause the swelling of an outer body. Thus, in the nonaqueous electrolytic solution to be used in a battery, the content of the halogen-substituted cyclic carbonate is 10 mass % or less, preferably 5 mass % or less, and further the content of the VC is 10 mass % or less, preferably 5 mass % or less.

A lithium salt to be used in the nonaqueous electrolytic solution is not particularly limited as long as it is dissociated in a solvent to form a lithium ion and is unlikely to effect a side reaction such as decomposition in a voltage range in which a battery is used. For example, inorganic lithium salts such as $LiClO_4$, $LiPF_6$, $LiBF_4$, $LiAsF_6$, and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), and $LiN(RfOSO_2)_2$ [where Rf represents a fluoroalkyl group] can be used.

The concentration of the lithium salt in the nonaqueous electrolytic solution is preferably 0.5 to 1.5 mol/L, more preferably 0.9 to 1.25 mol/L.

An organic solvent to be used in the nonaqueous electrolytic solution is not particularly limited as long as it dissolves the above-mentioned lithium salt and does not effect a side reaction such as decomposition in a voltage range in which a battery is used. Examples of the organic solvent include cyclic carbonate such as ethylene carbonate, propylene carbonate, and butylenes carbonate; chain carbonate such as dimethyl carbonate, diethyl carbonate, and methyl ethyl carbonate; chain ester such as methyl propionate; a cyclic ester such as γ-butyrolactone; chain ether such as dimethoxyethane, diethyl ether, 1,3-dioxolane, diglyme, triglyme, and tetraglyme; cyclic ether such as dioxolane, tetrahydrofuran, and 2-methyltetrahydrofuran; nitriles such as acetonitrile, propionitrile, and methoxypropionitrile; and sulfites such as ethylene glycol sulfite, and two or more kinds of those organic solvents can also be used in combination. In order to obtain a battery having more satisfactory characteristics, it is desired to use a combination of those organic solvents capable of achieving high conductivity, such as a mixed solvent of ethylene carbonate and chain carbonate.

[Separator]

It is preferred that a separator of the lithium secondary battery of the present invention have a property in which pores are closed (that is, a shut-down function) at 80° C. or more (more preferably 100° C. or more) and 170° C. or less (more preferably 150° C. or less), and a separator used in a general lithium secondary battery, for example, a fine porous film made of polyolefin such as polyethylene (PE) or polypropylene (PP) can be used. The fine porous fine film forming a separator may be, for example, made of only PE or only PP, or may be a laminate of a fine porous film made of PE and a fine porous film made of PP.

As a separator of the lithium secondary battery of the present invention, it is preferred to use a laminated type separator including a porous layer (I) containing a resin having a melting point of 140° C. or less as a main component and a porous layer (II) containing a resin that is not melted at a temperature of 150° C. or less or an inorganic filler having a heat-resistant temperature of 150° C. or more as a main component. The term "melting point" as used herein refers to melting temperature measured through use of a differential scanning calorimeter (DSC) in accordance with JIS K 7121. Further, the term "not melted at a temperature of 150° C. or less" means that melting behavior is not exhibited at a temperature of 150° C. or less during the above-mentioned melting temperature measurement, for example, the melting temperature measured through use of the DSC in accordance with JIS K 7121 is more than 150° C. Further, the term "heat-resistant temperature of 150° C. or more" refers to that deformation such as softening is not observed at least at 150° C.

The porous layer (I) of the laminated type separator mainly serves to ensure a shut-down function. When a lithium secondary battery reaches a melting point or more of a resin that is to serve as a main component of the porous layer (I), the resin of the porous layer (I) is melted to close pores of the separator, thereby causing shut-down for suppressing the proceeding of an electrochemical reaction.

As a resin having a melting point of 140° C. or less, which serves as a main component of the porous layer (I), for example, there is given PE. Examples of the form thereof include the above-mentioned fine porous film used in a lithium secondary battery, and the one obtained by applying a dispersion liquid containing PE particles to a base such as non-woven fabric, followed by drying. Herein, in the entire constituent components of the porous layer (I), the volume of a resin having a melting point of 140° C. or less, which is to serve as a main component, is 50 volume % or more, more preferably 70 volume % or more. For example, in the case where the porous layer (I) is formed of the PE fine porous film, the volume of a resin having a melting point of 140° C. or less is 100 volume %.

The porous layer (II) of the laminated type separator has a function of preventing a short-circuit caused by direct contact between a positive electrode and a negative electrode even when the internal temperature of a lithium secondary battery increases, and a resin that is not melted at a temperature of 150° C. or less or an inorganic filler having a heat-resistant temperature of 150° C. or more ensure the function. That is, in the case where a battery reaches high temperature, even if the porous layer (I) is contracted, the porous layer (II) that is unlikely to be contracted can prevent a short-circuit caused by direct contact between positive and negative electrodes, which may occur in the case where the separator is thermally contracted. Further, the heat-resistant porous layer (II) serves as a skeleton of the separator, and hence the thermal contraction of the porous layer (I), that is, the thermal contraction of the entire separator can also be suppressed.

In the case of forming the porous layer (II) containing a resin having a melting point of 150° C. or more as a main component, for example, there are given a form obtained by laminating a fine porous film (for example, the above-mentioned fine porous film for a battery made of PP) formed of a resin that is not melted at a temperature of 150° C. or less on the porous layer (I), and a coated and laminated type obtained by applying a dispersion liquid containing particles of a resin that is not melted at a temperature of 150° C. or less to the porous layer (I) and drying the resultant porous layer (I) to form the porous layer (II) on the surface of the porous layer (I).

Examples of the resin that is not melted at a temperature of 150° C. or less include PP; various cross-linked polymer fine particles such as cross-linked methyl polymethacrylate, cross-linked polystyrene, cross-linked polydivinylbenzene, a styrene-divinylbenzene copolymer cross-linked product, polyimide, a melamine resin, a phenol resin, and a benzoguanamine-formaldehyde condensate; polysulfone; polyethersulphone; polyphenylenesulfide; polytetrafluoroethylene; polyacrylonitrile; aramide; and polyacetal.

In the case of using particles of a resin that is not melted at a temperature of 150° C. or less, the average particle diameter thereof is for example preferably 0.01 μm or more, more preferably 0.1 μm or more, and preferably 10 μm or less, more preferably 2 μm or less. The average particle diameter of various particles as used herein is an average particle diameter D50% measured under the condition that these fine particles are dispersed in a medium that does not dissolve a resin, for example, through use of a laser scattering particle distribution analyzer "LA-920" produced by Horiba, Ltd., as described above.

In the case of forming the porous layer (II) containing an inorganic filler having a heat-resistant temperature of 150° C. or more as a main component, for example, there is given a coated and laminated type obtained by applying a dispersion liquid containing an inorganic filler having a heat-resistant temperature of 150° C. or more to the porous layer (I) and drying the resultant porous layer (I) to form the porous layer (II).

It is appropriate that the inorganic filler of the porous layer (II) is stable with respect to a nonaqueous electrolytic solution contained in a battery, having a heat-resistant temperature of 150° C. or more, and further is electrochemically stable so as not to be oxidized or reduced in a working voltage of a battery. The organic filler is preferably fine particles from the viewpoint of dispersion and the like, and alumina, silica, and boehmite are preferred. Alumina, silica, and boehmite have high oxidation tolerance, and the particle diameter and shape thereof can be regulated to desired numerical values. Therefore, alumina, silica, and boehmite enable the porosity of the porous layer (II) to be controlled with good accuracy. Regarding an inorganic filler having a heat-resistant temperature of 150° C. or more, for example, the inorganic fillers as illustrated above may be used alone or in combination with two or more kinds. The inorganic filler having a heat-resistant temperature of 150° C. or more may be used together with the above-mentioned resin that is not melted at a temperature of 150° C. or less.

The shape of the inorganic filler having a heat-resistant temperature of 150° C. or more of the porous layer (II) is not particularly limited, and various shapes such as a substantially spherical shape (including a spherical shape), a substantially elliptical shape (including an elliptical shape), and a plate shape can be used.

Further, the average particle diameter of the inorganic filler having a heat-resistant temperature of 150° C. or more of the porous layer (II) is preferably 0.3 μm or more, more preferably 0.5 μm or more, because the ion permeability is degraded when the average particle diameter is too small. Further, when an inorganic filler having a heat-resistant temperature of 150° C. or more is too large, the electric characteristics tend to be degraded, and hence, the average particle diameter thereof is preferably 5 μm or less, more preferably 2 μm or less.

In the porous layer (II), the resin that is not melted at a temperature of 150° C. or less and the inorganic filler having a heat-resistant temperature of 150° C. or more are contained in the porous layer (II) as main components. Therefore, the amounts of the resin and the inorganic filler in the porous layer (II) (in the case where the porous layer (II) contains either one of the resin that is not melted at a temperature of 150° C. or less and the inorganic filler having a heat-resistant temperature of 150° C. or more, the amounts of the resin and the inorganic filler in the porous layer (II) correspond to the amount of either one of the resin and the inorganic filler; and in the case where the porous layer (II) contains both of them, the amounts of the resin and the inorganic filler in the porous layer (II) correspond to the total amount thereof. Hereinafter, the same applies to the amounts of the resin that is not melted at a temperature of 150° C. or less and the inorganic filler having a heat-resistant temperature of 150° C. or more) are 50 volume % or more, preferably 70 volume % or more, more preferably 80 volume % or more, still more preferably 90 volume % or more in the entire volume of the constituent components of the porous layer (II). By setting the contents of the heat-resistant materials in the porous layer (II) to be high as described above, even when a lithium secondary battery reaches high temperature, the thermal contraction of the entire separator can be suppressed satisfactorily, and the occurrence of a short-circuit caused by direct contact between the positive and negative electrodes can be suppressed more satisfactorily.

As described later, it is preferred that the porous layer (II) also contain an organic binder. Therefore, the amounts of the resin that is not melted at a temperature of 150° C. or less and the inorganic filler having a heat-resistant temperature of 150° C. or more in the porous layer (II) be 99.5 volume % or less in the entire volume of the constituent components in the porous layer (II).

It is preferred that the porous layer (II) contains an organic binder so as to bind the resin that is not melted at a temperature of 150° C. or less to each other or bind the inorganic filler having a heat-resistant temperature of 150° C. or more to each other or so as to integrate the porous layer (II) with the porous layer (I). Examples of the organic binder include an ethylene-vinyl acetate copolymer (EVA derived from vinyl acetate and having a structural unit of 20 to 35 mol %), an ethylene-acrylic acid copolymer such as an ethylene-ethylene acrylate copolymer, a fluorine-based rubber, SBR, CMC, hydroxyethyl cellulose (HEC), polyvinyl alcohol (PVA), polyvinyl butyral (PVB), polyvinylpyrrolidone (PVP), a cross-linked acrylic resin, polyurethane, and an epoxy resin, and in particular, a heat-resistant binder having a heat-resistant temperature of 150° C. or more is preferably used. As the organic binder, those which are illustrated may be used alone or in combination with two or more kinds.

Of the illustrated organic binders, binders having high flexibility, such as EVA, an ethylene-acrylic acid copolymer, a fluorine-based rubber, and SBR, are preferred. Specific examples of the organic binder having a high flexibility include EVA "Evaflex Series" produced by Du Pont-Mitsui Polychemicals Co., Ltd., EVA produced by NUC Corporation, an ethylene-acrylic acid copolymer "Evaflex-EEA Series" produced by Du Pont-Mitsui Polychemicals Co., Ltd., EEA produced by NUC Corporation, a fluorine rubber "Daiel Latex Series" produced by Daikin Industries, Ltd., SBR "TRD-2001" produced by JSR Corporation, and SBR "BM-400B" produced by ZEON Corporation.

In the case where the organic binder is used in the porous layer (II), it is appropriate that an emulsion form is used in which the organic binder is dissolved or dispersed in a solvent of a composition for forming the porous layer (II) described later.

The coated and laminated type separator can be produced, for example, by applying a composition (liquid composition such as slurry) for forming the porous layer (II) containing particles of a resin that is not melted at a temperature of 150° C. or less and an inorganic filler having a heat-resistant temperature of 150° C. or more to the surface of a fine porous film for forming the porous layer (I) and drying the resultant fine porous film at predetermined temperature to form the porous layer (II).

The composition for forming the porous layer (II) contains particles of a resin that is not melted at a temperature of 150° C. or less and/or an inorganic filler having a heat-resistant temperature of 150° C. or more, and an organic binder as needed, in which the resin, the inorganic filler, and the organic binder are dispersed in a solvent (including a dispersion medium, which is also applied hereinafter). The organic binder can also be dissolved in the solvent. As the solvent to be used in the composition for forming the porous layer (II), general organic solvents: for example, aromatic hydrocarbon such as toluene; furans such as tetrahydrofuran; and ketones such as methyl ethyl ketone and methyl isobutyl ketone are preferably used, as long as they are capable of uniformly dispersing particles of the resin that is not melted at a temperature of 150° C. or less, the inorganic filler, and the like, and are also capable of uniformly dissolving or dispersing the organic binder. Alcohols (ethylene glycol, propylene glycol, etc.) or various propylene oxide based glycol ether such as monomethyl acetate, etc. may be added as needed to the solvents for the purpose of controlling interfacial tension. Further, in the case where the organic binder is water-soluble, when the organic binder is used as an emulsion, water may be used as a solvent. In this case, alcohols (methyl alcohol, ethyl alcohol, isopropyl alcohol, ethylene glycol, etc.) can also be added as needed to control interfacial tension.

In the composition for forming the porous layer (II), it is preferred that a solid content containing particles of the resin that is not dissolved at a temperature of 150° C. or less and/or the inorganic filler having a heat-resistant temperature of 150° C. or more, and further the organic binder be, for example, 10 to 80 mass %.

In the laminated type separator, it is not required that the porous layer (I) and the porous layer (II) are respectively one layer, and a plurality of layers may be present in the separator. For example, the porous layer (II) may be disposed on both surfaces of the porous layer, or the porous layer (II) may be disposed on both surfaces of the porous layer (I). It should be noted that, when the number of layers is increased, there is a risk that the thickness of the separator is increased to increase the internal resistance of a battery or to decrease the energy density; and hence it is not preferred to increase the number of layers excessively. The total number of layers of the porous layer (I) and the porous layer (II) in the laminated type separator is preferably 5 layers or less.

The thickness of the separator (separator formed of a fine porous film made of polyolefin or the laminated type separator) of the lithium secondary battery of the present invention is, for example, preferably 10 to 30 μm.

Further, in the laminated type separator, it is preferred that the thickness of the porous layer (II) [in the case where the separator includes a plurality of the porous layers (II), the thickness of the porous layer (II) refers to the total thickness thereof, which is also applied hereinafter] be 3 μm or more from the viewpoint of causing the porous layer (II) to exhibit each of the above-mentioned functions more effectively. It should be noted that, when the porous layer (II) is too thick, there is a risk that the energy density of a battery may be decreased, and hence it is preferred that the thickness of the porous layer (II) be 8 μm or less.

Further, in the laminated type separator, the thickness of the porous layer (I) [in the case where the separator includes a plurality of the porous layers (I), the thickness of the porous layer (I) refers to the total thickness thereof, which is also applied hereinafter] is preferably 6 μm or more, more preferably 10 μm or more from the viewpoint of causing the porous layer (I) to exhibit the above-mentioned functions (in particular, the shut-down function) more effectively. It should be noted that, when the porous layer (I) is too thick, there is a risk that the energy density of a battery is decreased, and in addition the force at which the porous layer (I) is thermally contracted increases to degrade the function of suppressing the thermal contraction of the entire separator. Therefore, the thickness of the porous layer (I) is preferably 25 μm or less, more preferably 20 μm or less, still more preferably 14 μm or less.

It is preferred that the porosity of the entire separator be 30% or more in a dried state so as to render ion permeability satisfactory by ensuring a liquid retention amount of an electrolytic solution. On the other hand, it is preferred that the porosity of the separator be 70% or less in a dried state from the viewpoint of ensuring separator strength and preventing an internal short-circuit. The porosity of the separator P (%) can be calculated by determining a sum regarding each component "i" through use of the following Expression (5) from the thickness of the separator, the mass per area thereof, and the density of constituent components thereof.

$$P=\{1-m/(\Sigma a_i\rho_i\times t)\}\times 100 \quad (5)$$

In the Expression (5), $a_i$ represents a ratio of a component "i" represented by a mass %; $\rho_i$ represents density (g/cm$^3$) of the component "i"; "m" represents a mass per unit area (g/cm$^2$) of the separator; and "t" represents thickness (cm) of the separator.

Further, in the case of the laminated type separator, by defining "m" to be a mass per unit area (g/cm$^2$) of the porous layer (I) and defining "t" to be thickness (cm) of the porous layer (I) in the Expression (5), the porosity P(%) of the porous layer (I) can also be obtained through use of the Expression (5). It is preferred that the porosity of the porous layer (I) obtained by this method be 30 to 70%.

Further, in the case of the laminated type separator, by defining "m" to be a mass per unit area (g/cm$^2$) of the porous layer (II) and defining "t" to be thickness (cm) of the porous layer (II) in the Expression (5), the porosity of the porous layer (II) can also be obtained through use of the Expression (5). It is preferred that the porosity of the porous layer (II) obtained by this method be 20 to 60%.

As the separator, those which have a high mechanical strength are preferred, and for example, it is preferred that piercing strength be 3 N or more. For example, in the case where $SiO_x$ that changes greatly in volume during charge and discharge is used as a negative active material, when charge and discharge are repeated, mechanical damage is also applied to opposed separators due to the expansion/contraction of the entire negative electrode. When the piercing strength of the separator is 3 N or more, satisfactory mechanical strength is ensured, and mechanical damage applied to the separator can be alleviated.

As a separator having a piercing strength of 3 N or more, there is given the above-mentioned laminated type separator, and in particular, a separator, in which the porous layer (II) containing an inorganic filler having a heat-resistant temperature of 150° C. or more as a main component is laminated on the porous layer (I) containing a resin having a melting point of 140° C. or less as a main component, is preferred. The reason for this is considered as follows: the inorganic filler has a high mechanical strength, and hence the inorganic filler reinforces the mechanical strength of the porous layer (I) to enhance the mechanical strength of the entire separator.

The piercing strength can be measured by the following method. The separator is fixed onto a plate having a 2-inch diameter hole without creating wrinkles and sags, and a hemispherical metallic pin with a tip diameter of 1.0 mm is penetrated through the measurement sample at a speed of 120 mm/min, and the force required to form a hole in the separator is measured five times. Then, three measured values out of the five measured values excluding the highest and lowest values are averaged and defined as the piercing strength of the separator.

As the above-mentioned positive electrode, negative electrode, and separator, a laminated electrode body in which a positive electrode and a negative electrode are laminated with a separator interposed therebetween or a wound electrode body obtained by further winding the laminated electrode body in a spiral shape can be used in the lithium secondary battery of the present invention.

In the above-mentioned laminated electrode body or wound electrode body, in the case of using the laminated type separator, in particular, a separator, in which the porous layer (II) containing an inorganic filler having a heat-resistant temperature of 150° C. or more as a main component, is laminated on the porous layer (I) containing a resin having a melting point of 140° C. or less as a main component, it is preferred that the porous layer (II) be opposed to at least a positive electrode. In this case, the oxidation of the separator by the positive electrode can be suppressed more satisfactorily by placing the porous layer (II) containing an inorganic filler having a heat-resistant temperature of 150° C. or more as a main component and being more excellent in oxidation tolerance so that the porous layer (II) is opposed to the positive electrode, and hence storage characteristics at high temperature and charge and discharge cycle characteristics of a battery can also be enhanced. Further, in the case where additives such as VC and cyclohexylbenzene are added to a nonaqueous electrolytic solution, there is also a risk that a coating film is formed on a positive electrode side to clog pores of the separator, which may degrade battery characteristics. Therefore, it can also be expected that clogging of pores is suppressed by placing the relatively porous layer (II) so that the porous layer (II) is opposed to the positive electrode.

On the other hand, in the case where one surface of the laminated type separator is the porous layer (I), it is preferred that the porous layer (I) be opposed to a negative electrode. Thus, for example, a thermoplastic resin melted from the porous layer (I) during shut-down is prevented from being absorbed by an electrode material mixture layer to allow the pores of the separator to be closed efficiently.

[Form of Battery]

The form of the lithium secondary battery of the present invention may be cylindrical (e.g., rectangular cylindrical or circular cylindrical) using a steel can or an aluminum can as an outer can. Further, the lithium secondary battery of the present invention can also be of a soft package type using a metal-evaporated laminated film as an outer body.

The lithium secondary battery of the present invention can be used in the same applications as various applications of conventionally known lithium secondary batteries.

[Battery Voltage]

The lithium secondary battery of the present invention is used while being charged with a charge voltage of 4.2 V or more. However, as described above, when the battery configuration of the present invention is used, a lithium secondary battery having a high capacity and satisfactory storage characteristics and cycle characteristics can be obtained even when a charge voltage is 4.3 V or more (under high voltage).

EXAMPLES

Hereinafter, the present invention is described in detail by way of examples. However, it should be noted that the examples given below are not intended to limit the scope of the present invention.

<Synthesis of Lithium-Containing Composite Oxide A Containing Nickel>

A coprecipitated compound (spherical coprecipitated compound) containing Ni, Co and Mn was synthesized by placing, in a reaction vessel, ammonia water having a pH adjusted to approximately 12 by addition of sodium hydroxide, and then, while strongly stirring, adding dropwise a mixed aqueous solution containing nickel sulfate, cobalt sulfate and manganese sulfate at a concentration of 2.4 mol/dm$^3$, 0.8 mol/dm$^3$ and 0.8 mol/dm$^3$ respectively, and ammonia water having a concentration of 25 mass % at a rate of 23 cm$^3$/min and 6.6 cm$^3$/min respectively, using a metering pump. At this time, the temperature of the reaction solution was held at 50° C., an aqueous solution of sodium hydroxide having a concentration of 6.4 mol/dm$^3$ was also added dropwise such that the pH of the reaction solution was maintained at around 12, and a nitrogen gas was bubbled at a flow rate of 1 dm$^3$/min so as to further effect a reaction in an inactive atmosphere.

The coprecipitated compound was washed with water, filtrated and dried to obtain a hydroxide containing Ni, Co and Mn at a molar ratio of 6:2:2. The obtained hydroxide in an amount of 0.196 mol and 0.204 mol of LiOH.H$_2$O were dispersed in ethanol to form slurry, and the slurry was mixed for 40 minutes using a planetary ball mill and dried at room temperature to obtain a mixture. Subsequently, the mixture was placed in an alumina crucible, heated to 600° C. in a dry air flow of 2 dm$^3$/min, held at that temperature for two hours for preheating, and fired for 12 hours by further increasing the temperature to 900° C. A lithium-containing composite oxide A was thereby synthesized.

The obtained lithium-containing composite oxide A was washed with water and subjected to a heat treatment at 850° C. for 12 hours in the atmosphere (oxygen concentration: about 20 volume %). After that, the lithium-containing composite oxide A was pulverized into powder using a mortar. The pulverized lithium-containing composite oxide A was stored in a desiccator.

The lithium-containing composite oxide A was analyzed for a composition through use of the above-mentioned ICP method. First, 0.2 g of the lithium-containing composite oxide was collected and placed in a 100 mL container. Then, 5 mL of pure water, 2 mL of aqua regia, and 10 mL of pure water were added to the container successively. The resultant mixture was dissolved by heating. After the mixture was cooled, the mixture was further diluted by 25 times with pure water and was analyzed for a composition by a calibration curve method through use of an IPC analysis device "ICP-757" produced by Jarrelash Co., Japan. The composition of the lithium-containing composite oxide A was derived from the obtained results and found to be represented by $Li_{1.02}Ni_{0.6}Cu_{0.2}Mn_{0.2}O_2$.

<Synthesis of Lithium-Containing Composite Oxide B Containing Nickel>

A coprecipitated compound (spherical coprecipitated compound) containing Ni, Mn and Co was synthesized by placing, in a reaction vessel, ammonia water having a pH adjusted to approximately 12 by addition of sodium hydroxide, and then, while strongly stirring, adding dropwise a mixed aqueous solution containing nickel sulfate, manganese sulfate and cobalt sulfate at a concentration of 3.76 mol/dm$^3$, 0.21 mol/dm$^3$ and 0.21 mol/dm$^3$, respectively, and ammonia water having a concentration of 25 mass % at a rate of 23 cm$^3$/min and 6.6 cm$^3$/min, respectively, using a metering pump. At this time, the temperature of the reaction solution was held at 50° C., an aqueous solution of sodium hydroxide having a concentration of 6.4 mol/dm$^3$ was also added dropwise such that the pH of the reaction solution was maintained at around 12, and a nitrogen gas was bubbled at a flow rate of 1 dm$^3$/min so as to further effect a reaction in an inactive atmosphere.

The coprecipitated compound was washed with water, filtrated and dried to obtain a hydroxide containing Ni, Mn and Co at a molar ratio of 90:5:5. The obtained hydroxide in an amount of 0.196 mol, 0.204 mol of LiOH.H$_2$O, and 0.001 mol of TiO$_2$ were dispersed in ethanol to form slurry, and the slurry was mixed for 40 minutes using a planetary ball mill and dried at room temperature to obtain a mixture. Subsequently, the mixture was placed in an alumina crucible, heated to 600° C. in a dry air flow of 2 dm$^3$/min, held at that temperature for two hours for preheating, and fired for 12 hours by further increasing the temperature to 800° C. A lithium-containing composite oxide B was thereby synthesized. The obtained lithium-containing composite oxide B was pulverized into powder using a mortar and was stored in a desiccator.

The lithium-containing composite oxide B was analyzed for a composition in the same way as in the lithium-containing composite oxide A. The composition of the lithium-containing composite oxide B was derived from the obtained results and found to be represented by $Li_{1.02}Ni_{0.895}Co_{0.05}Mn_{0.05}Ti_{0.005}O_2$.

<Synthesis of Lithium-Containing Composite Oxide C Containing Nickel>

A lithium-containing composite oxide C was synthesized in the same way as in the lithium-containing composite oxide A except for synthesizing a hydroxide containing Ni, Co, and Mn in a molar ratio of 1:1:1 by regulating the concentration of a raw material compound in a mixed aqueous solution to be used for synthesizing a coprecipitated compound and using the synthesized hydroxide. The lithium-containing composite oxide C was analyzed for a composition in the same way as in the lithium-containing composite oxide A, and the composition of the lithium-containing composite oxide C was derived from the obtained results and found to be presented by $Li_{1.02}Ni_{0.3}Co_{0.3}Mn_{0.3}O_2$.

Examples 1 to 5

Production of Positive Electrode

The above-mentioned synthesized lithium-containing composite oxide A containing nickel and $LiCoO_2$ that was another lithium-containing composite oxide were weighed in a mass ratio shown in Table 1 and mixed for 30 minutes through use of a Henschel mixer to obtain a mixture. Then, 100 parts by mass of the obtained mixture serving as a positive active material, 20 parts by mass of a solution in which PVDF and P(TFE-VDF) serving as binders were dissolved in N-methyl-2-pirorridone (NMP), 1.04 parts by mass of carbon fibers serving as a conductive agent, having an average fiber length of 100 nm and an average fiber diameter of 10 nm, and 1.04 parts by mass of graphite were kneaded through use of a biaxial kneader. Further, NMP was added to the resultant mixture to regulate the viscosity thereof to prepare a paste containing a positive electrode material mixture. The use amount of the NMP solution of the PVDF and the P (TFE-VDF) was set so that the amounts of the dissolved PVDF and P (TFE-VDF) became 2.34 mass % and 0.26 mass %, respectively, in a total 100 mass % (that is, total amount of the positive electrode material mixture layer) of the mixture of the lithium-containing composite oxide A and the $LiCoO_2$, the PVDF, the P (TFE-VDF), and the conductive agent. That is, the total binder amount in the positive electrode material mixture layer is 2.6 mass %, and the ratio of the P (TFE-VDF) in a total 100 mass % of the P (TFE-VDF) and the PVDF is 10 mass %.

The paste containing a positive electrode material mixture was intermittently applied to both surfaces of an aluminum foil (positive electrode collector) having a thickness of 15 μm with the thickness being regulated. After the paste containing a positive electrode material mixture was dried, the thickness of the positive electrode material mixture layer was regulated so as to obtain a total thickness of 130 μm by a calendar treatment, and the positive electrode material mixture layer thus obtained was cut to a width of 54.5 mm to produce a positive electrode. Further, a tab was welded to an exposed portion of the aluminum foil of the positive electrode to form a lead portion. Herein, the density of the positive electrode material mixture layer measured by the above-mentioned method was 3.80 g/cm$^3$.

<Production of Negative Electrode>

Ninety-eight parts by mass of a negative active material obtained by mixing a composite (amount of a carbon material in the composite: 10 mass %) containing SiO having an average particle diameter D50% of 8 μm covered with a carbon material with graphite having an average particle diameter D50% of 16 μm in such amounts that the amount of the composite containing SiO covered with a carbon material became 3.0 mass %, 100 parts by mass of a CMC aqueous solution having a concentration of 1 mass % with the viscosity being adjusted in a range of 1,500 to 5,000 mPa·s, and 1.0 part by mass of SBR were mixed using ion exchange water having a specific resistance of $2.0×10^5$ Ωcm or more as a solvent, whereby an aqueous paste containing a negative electrode material mixture was prepared.

The paste containing a negative electrode material mixture was intermittently applied to both surfaces of a copper foil (negative electrode collector) having a thickness of 8 μm with the thickness being regulated. After the paste containing a negative electrode material mixture was dried, the thickness of the negative electrode material mixture layer was adjusted so as to obtain a total thickness of 110 μm by a calendar treatment, and the negative electrode material mixture layer thus obtained was cut to a width of 55.5 mm to produce a negative electrode. Further, a tab was welded to an exposed portion of the copper foil of the negative electrode to form a lead portion.

<Production of Separator>

5 kg of ion exchange water and 0.5 kg of a dispersant (aqueous polycarboxylic acid ammonium salt, solid content concentration: 40 mass %) were added to 5 kg of boehmite secondary aggregate having an average particle diameter D50% of 3 μm, and the resultant mixture was crushed for 10 hours with a ball mill having an internal volume of 20 L and a rotation number of 40 times/min to prepare a dispersion liquid. A part of the dispersion liquid after the treatment was vacuum-dried at 120° C. and observed with a scanning electronic microscope (SEM). As a result, the boehmite had a substantially plate shape. Further, the average particle diameter D50% of the treated boehmite was 1 μm.

0.5 g of xanthan gum serving as a thickener and 17 g of a resin binder dispersion (modified polybutyl acrylate, solid content: 45 mass %) serving as a binder were added to 500 g of the dispersion liquid, and the mixture was stirred with a three-one motor for 3 hours to prepare uniform slurry [slurry for forming the porous layer (II), solid content ratio: 50 mass %].

One surface of a fine porous separator made of PE for a lithium secondary battery [porous layer (I) having a thickness of 12 μm, a porosity of 40%, an average hole diameter of 0.08 μm, and a PE melting point of 135° C.] was subjected to a corona discharge treatment (discharge amount: 40 W·min/m$^2$), and the slurry for forming the porous layer (II) was applied to the treated surface through use of a microgravure coater. Then, the slurry for forming the porous layer (II) was dried to form the porous layer (II) having a thickness of 4 μm, whereby a laminated type separator was obtained. The mass per unit area of the porous layer (II) in the separator was 5.5 g/m$^2$, the volume content of boehmite thereof was 95 volume %, and the porosity thereof was 45%.

<Assembly of Battery>

The positive electrode and negative electrode obtained as described above were laminated with the porous layer (II) serving as the separator interposed therebetween so as to be opposed to the positive electrode, and the laminate was wound in a spiral shape to produce a wound electrode body. The obtained wound electrode body was pressed to be flat and inserted into an outer can made of an aluminum alloy having a thickness of 5 mm, a width of 42 mm, and a height of 61 mm. Further, as a nonaqueous electrolytic solution, a solution was prepared by mixing ethylene carbonate, ethylene methyl carbonate, and diethyl carbonate in a volume ratio of 1:1:1 to obtain a solvent, dissolving $LiPF_6$ in the solvent in a concentration of 1.1 mol/L, adding 2.0 mass % of FEC and 1.0 mass % of VC to the resultant solvent, and further adding triethyl phosphonoacetate to the solvent in a concentration shown in Table 1. Next, the nonaqueous electrolytic solution was injected into the outer can, and initial charge and discharge were performed.

Figure 1B:
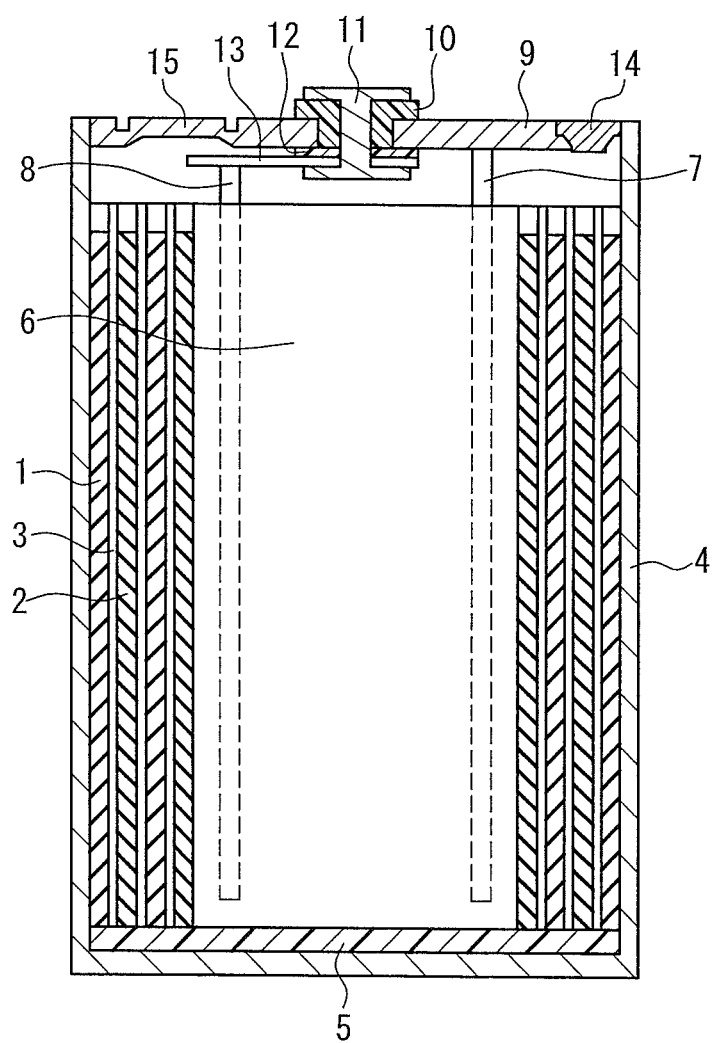
FIG. 1B is a sectional view thereof.
Figure 2:
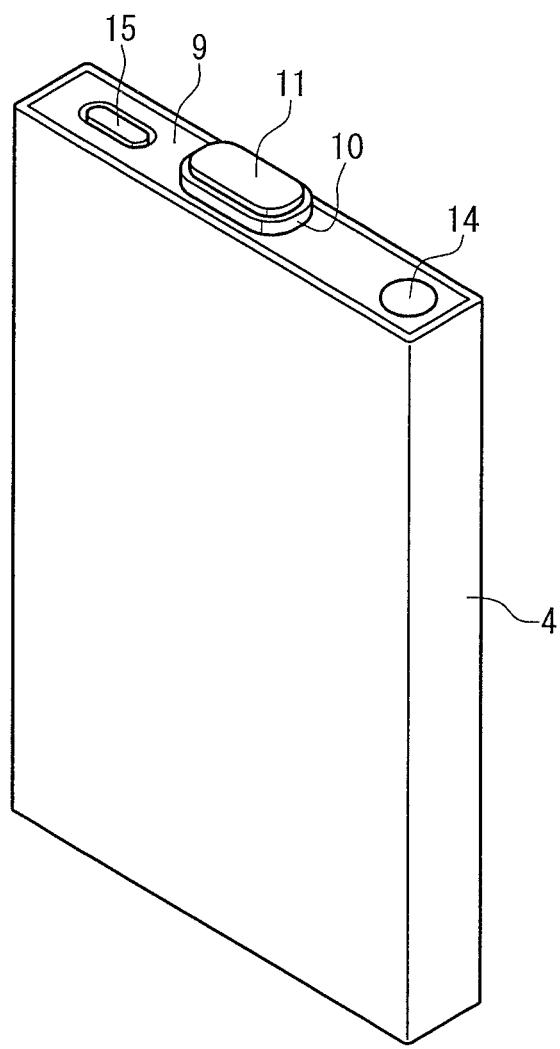
FIG. 2 is a perspective view showing an example of the lithium secondary battery of the present invention.

The outer can was sealed after the nonaqueous electrolytic solution was injected thereto, whereby a lithium secondary battery having a structure shown in FIGS. 1A and 1B and having an external appearance shown in FIG. 2 was produced. This battery includes, in an upper portion of the outer can, a cleavage vent for reducing a pressure in the case where an internal pressure increases.

A battery shown in FIGS. 1A, 1B, and 2 is described below. FIG. 1A is a plan view of a lithium secondary battery of the present example, and FIG. 1B is a sectional view of FIG. 1A. As shown in FIG. 1B, a positive electrode 1 and a negative electrode 2 are wound in a spiral shape with a separator 3 interposed therebetween as described above, and thereafter, the resultant laminate is pressed so as to be flat. The flat laminate thus obtained is accommodated as a wound electrode body 6 in a rectangular cylindrical outer can 4 together with an electrolytic solution. It should be noted that, in order to avoid complication, FIG. 1B does not show a metallic foil serving as a collector used for producing the positive electrode 1 and the negative electrode 2 or the electrolytic solution. Further, each layer of the separator 3 is not shown separately.

The outer can 4 is made of an aluminum alloy and forms a battery outer body. The outer can 4 also serves as a positive electrode terminal. An insulator 5 made of a PE sheet is disposed in a bottom portion of the outer can 4, and a positive electrode lead 7 and a negative electrode lead 8 respectively connected to each one end of the positive electrode 1 and the negative electrode 2 are led out from the wound electrode body 6 including the positive electrode 1, the negative electrode 2, and the separator 3. Further, a terminal 11 made of stainless steel is attached to a sealing cover plate 9 made of an aluminum alloy for sealing an opening of the outer can 4 through intermediation of an insulating packing 10 made of PP, and a lead plate 13 made of stainless steel is attached to the terminal 11 through intermediation of an insulator 12.

The cover plate 9 is inserted in the opening of the outer can 4, and a connection portion therebetween is welded, whereby the opening of the outer can 4 is sealed and the inside of the battery is hermetically sealed. Further, in the battery of FIGS. 1A and 1B, a nonaqueous electrolytic solution injection port 14 is provided in the cover plate 9, and the nonaqueous electrolytic solution injection port 14 is sealed, for example, by laser welding while a sealing member is inserted in the nonaqueous electrolytic solution injection port 14, with the result that the hermeticity of the battery is ensured. Thus, in the battery of FIGS. 1A, 1B, and 2, actually, the nonaqueous electrolytic solution injection port 14 is formed of the nonaqueous electrolytic solution injection port and the sealing member; however, for ease of description, the nonaqueous electrolyte injection port 14 is merely shown. Further, the cover plate 9 is provided with a cleavage vent 15 serving as a mechanism for discharging gas in the battery when the temperature of the battery increases.

In the battery of the present example, the outer can 4 and the cover plate 9 are allowed to function as a positive electrode terminal by directly welding the positive electrode lead 7 to the cover plate 9, and the terminal 11 is allowed to function as a negative electrode terminal by welding the negative electrode lead 8 to a lead plate 13 and bringing the negative electrode lead 8 and the terminal 11 into conduction through the lead plate 13. However, the positive and negative sides may be reversed in some cases depending on the material for the outer can 4.

FIG. 2 is a perspective view of a lithium secondary battery of the present example. FIG. 2 shows the lithium secondary battery for the purpose of illustrating that the battery is a rectangular battery. Therefore, FIG. 2 schematically show the battery and illustrate only particular members among those which form the battery. Further, in FIG. 1B, a portion on an inner circumferential side of the wound electrode body 6 is not shown as a cross-section.

Example 6

A wound electrode body was produced in the same way as in Example 1, except that the above-mentioned synthesized lithium-containing composite oxide B containing nickel and $LiCoO_2$ that was another lithium-containing composite oxide were weighed and mixed in a mass ratio of 0.5:0.5, and the mixture was used as a positive active material. Further, the density of a positive electrode material mixture layer measured by the above-mentioned method was 3.80 $g/cm^3$. Next, a nonaqueous electrolytic solution similar to that used in Example 1 was injected into the outer can, and a lithium secondary battery was produced in the same way as in Example 1, except for setting the concentration of triethyl phosphonoacetate to 5.0 mass %.

Example 7

A wound electrode body was produced in the same way as in Example 1 except for using only the above-mentioned synthesized lithium-containing composite oxide C containing nickel as a positive active material. Further, the density of a positive electrode material mixture layer measured by the above-mentioned method was 3.80 $g/cm^3$. Next, a nonaqueous electrolytic solution similar to that used in Example 1 was injected into the outer can, and a lithium secondary battery was produced in the same way as in Example 1.

Example 8

A wound electrode body was produced in the same way as in Example 1 except that the above-mentioned synthesized lithium-containing composite oxide A containing nickel and $LiCoO_2$ that was another lithium-containing composite oxide were weighed and mixed in a mass ratio of 0.1:0.9 and the mixture was used as a positive active material, and only graphite having an average particle diameter D50% of 16 μm was used as a negative active material. Further, the density of the positive electrode material mixture layer measured by the above-mentioned method was 3.80 $g/cm^3$. Next, a nonaqueous electrolytic solution similar to that used in Example 1 was injected into the outer can, and a lithium secondary battery was produced in the same way as in Example 1, except for setting the concentration of triethyl phosphonoacetate to 0.5 mass %.

Example 9

The above-mentioned synthesized lithium-containing composite oxide A containing nickel and $LiCoO_2$ that was another lithium-containing composite oxide were weighed in a mass ratio of 0.5:0.5 and mixed for 30 minutes through use of a Henschel mixer to obtain a mixture. A wound electrode body was produced in the same way as in Example 1 except for using 100 parts by mass of the obtained mixture as a positive active material and using 2.08 parts by mass of acetylene black as a conductive agent. Further, the density of a positive electrode material mixture layer measured by the above-mentioned method was 3.40 g/cm$^3$. A nonaqueous electrolytic solution similar to that used in Example 1 was injected into the outer can, and a lithium secondary battery was produced in the same way as in Example 1.

Example 10

The above-mentioned synthesized lithium-containing composite oxide A containing nickel and LiCoO$_2$ that was another lithium-containing composite oxide were weighed in a mass ratio of 0.5:0.5 and mixed for 30 minutes through use of a Henschel mixer to obtain a mixture. A wound electrode body was produced in the same way as in Example 1 except for using 100 parts by mass of the obtained mixture as a positive active material, using only PVDF as a binder, and adjusting the total amount of the PVDF in a positive electrode material mixture layer to 2.6 mass %. Further, the density of the positive electrode material mixture layer measured by the above-mentioned method was 3.60 g/cm$^3$. A nonaqueous electrolytic solution similar to that used in Example 1 was injected into the outer can, and a lithium secondary battery was produced in the same way as in Example 1.

Examples 11 to 13

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.2:0.8, and the mixture was used as a positive active material. Further, the density of a positive electrode material mixture layer measured by the above-mentioned method was 3.8 g/cm$^3$. Next, a nonaqueous electrolytic solution similar to that used in Example 1 was injected into the outer can, and a lithium secondary battery was produced in the same way as in Example 1, except for adding 2-propynyl (diethylphosphono)acetate, in place of triethyl phosphonoacetate, so as to achieve each concentration shown in Table 1.

Example 14

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.5:0.5, and the mixture was used as a positive active material. Further, the density of a positive electrode material mixture layer measured by the above-mentioned method was 3.8 g/cm$^3$. Next, a nonaqueous electrolytic solution similar to that used in Example 1 was injected into the outer can, and a lithium secondary battery was produced in the same way as in Example 1, except for adding 2-propynyl (diethylphosphono)acetate, in place of triethyl phosphonoacetate, so as to achieve a concentration of 1.0 mass %.

Example 15

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.2:0.8, and the mixture was used as a positive active material. Next, a nonaqueous electrolytic solution similar to that used in Example 1 was injected into the outer can, and a lithium secondary battery was produced in the same way as in Example 1, except for adding 2-propynyl(dimethylphosphono)acetate, in place of triethyl phosphonoacetate, so as to achieve a concentration of 1.0 mass %.

Example 16

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.2:0.8 and the mixture was used as a positive active material, and only graphite having D50% of 16 µm was used as a negative active material instead of using a composite in which the surface of SiO was covered with a carbon material. Next, a nonaqueous electrolytic solution similar to that used in Example 1 was injected into the outer can, and a lithium secondary battery was produced in the same way as in Example 1, except for adding 2-propynyl(diethylphosphono)acetate, in place of triethyl phosphonoacetate, so as to achieve a concentration of 1.0 mass %.

Comparative Example 1

A wound electrode body was produced in the same way as in Example 1 except for using only LiCoO$_2$ as a positive active material. Further, the density of a positive electrode material mixture layer measured by the above-mentioned method was 3.80 g/cm$^3$. Next, a nonaqueous electrolytic solution similar to that used in Example 1 was injected into the outer can, and a lithium secondary battery was produced in the same way as in Example 1.

Comparative Example 2

A lithium secondary battery was produced in the same way as in Example 1 except for setting the concentration of triethyl phosphonoacetate in the nonaqueous electrolytic solution to 0.3 mass %.

Comparative Example 3

A lithium secondary battery was produced in the same way as in Example 1 except for using a nonaqueous electrolytic solution obtained by adding 1,3-propane sultone in an amount so as to achieve a concentration of 2.0 mass %, in place of triethyl phosphonoacetate.

Comparative Examples 4 to 5

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.2:0.8, and the mixture was used as a positive active material. Next, a nonaqueous electrolytic solution similar to that used in Example 1 was injected into the outer can, and a lithium secondary battery was produced in the same way as in Example 1, except for adding 2-propynyl(diethylphosphono)acetate, in place of triethyl phosphonoacetate, so as to achieve each concentration shown in Table 1.

Comparative Example 6

A wound electrode body was produced in the same way as in Comparative Example 3 except that the above-mentioned lithium-containing composite oxide B containing nickel and LiCoO$_2$ that was another lithium-containing composite oxide were weighed and mixed in a mass ratio of 0.5:0.5, and the mixture was used as a positive active material. Further, the density of a positive electrode material mixture layer measured by the above-mentioned method was 3.8 g/cm$^3$.

Comparative Example 7

A wound electrode body was produced in the same way as in Example 1 except that the above-mentioned synthesized lithium-containing composite oxide B containing nickel and LiCoO$_2$ that was another lithium-containing composite oxide were weighed and mixed in a mass ratio of 0.2:0.8 and the mixture was used as a positive active material, and only graphite having D50% of 16 μm was used as a negative active material instead of using a composite in which the surface of SiO was covered with a carbon material. Next, a nonaqueous electrolytic solution similar to that used in Example 1 was injected into the outer can, and a lithium secondary battery was produced in the same way as in Example 1, except for not adding triethyl phosphonoacetate.

Table 1 shows the kind and mass ratio of a positive active material of a positive electrode used in each of the lithium secondary batteries of Examples 1 to 16 and Comparative Examples 1 to 7, a molar ratio of the total nickel amount with respect to the total lithium amount in the total positive electrode active material calculated by the Expression (3) (hereinafter, abbreviated as "Ni/Li ratio"), and a content of a phosphonoacetate-based compound in a nonaqueous electrolytic solution.

Further, the lithium secondary batteries produced in Examples 1 to 16 and Comparative Examples 1 to 7 were evaluated for battery capacity, battery swelling, a capacity recovery ratio after high-temperature storage, and charge and discharge cycle characteristics (capacity retention rate) by procedures described below. Tables 2 and 3 show the results.

<Battery Capacity>

Each battery was subjected to initial charge and discharge, and thereafter, each battery capacity was obtained by the following methods (I) and (II).

(I) Each battery after the initial charge and discharge was charged to 4.2 V at room temperature (25° C.) and a constant current of 1 C. Then, the battery was subjected to constant current-constant voltage charge (total charge time: 2.5 hours) for charging at a constant voltage of 4.2 V and constant-current discharge of 0.2 C (discharge end voltage: 3.0 V). The discharge capacity (mAh) thus obtained was defined as a battery capacity. In Table 2, the discharge capacity measured in each example and each comparative example is shown as a relative battery capacity (I) (%) obtained by expressing a value, which is obtained by dividing the discharge capacity measured in each example and each comparative example by the discharge capacity of Example 1, in terms of a percentage.

(II) Each battery after the initial charge and discharge was charged to 4.35 V at room temperature (25° C.) and a constant current of 1 C. Then, the battery was subjected to constant current-constant voltage charge (total charge time: 2.5 hours) for charging at a constant voltage of 4.35 V and constant-current discharge of 0.2 C (discharge end voltage: 3.0 V). The discharge capacity (mAh) thus obtained was defined as a battery capacity. In Table 3, the discharge capacity measured in each example and each comparative example is shown as a relative battery capacity (II) (%) obtained by expressing a value, which is obtained by dividing the discharge capacity measured in each example and each comparative example by the discharge capacity of Example 1, in terms of a percentage.

<Battery Swelling>

After each battery was subjected to initial charge and discharge, each battery was charged under the same conditions as those of the measurement methods (I) and (II) of a battery capacity. A thickness $T_1$ of an outer can of the battery after being charged was measured in advance, and then the battery was stored in a thermostatic oven set to 85° C. for 24 hours. The battery was taken out from the thermostatic oven and left to stand at room temperature for 3 hours. Then, a thickness $T_2$ of the outer can was measured again. Herein, the thickness of the outer can refers to thickness of an outer can between wide side surfaces. The thickness of the outer can was measured as follows: the thickness of a center of a wide side surface portion was measured in the unit of one millionth of a millimeter through use of calipers "CD-15CX" produced by Mitsutoyo Corporation.

Then, the battery swelling was evaluated from a change ratio from the thickness $T_1$ to $T_2$ of the outer can before and after storage with respect to the thickness $T_1$ of the outer can before storage at 85° C. That is, the battery swelling was evaluated based on a battery swelling ratio (%) obtained by the following expression.

$$\text{Battery swelling}(\%) = 100 \times (T_2 - T_1)/(T_1)$$

The battery swelling measured at a time of charge by the method (I) is expressed as battery swelling ratio (I) (%) in Table 2, and the battery swelling measured at a time of charge by the method (II) is expressed as battery swelling ratio (II) (%) in Table 3.

<Capacity Recovery Ratio after High-Temperature Storage>

After each battery was subjected to initial charge and discharge, the battery was charged under the same conditions as those of the measurement methods (I) and (II) of a battery capacity. Then, the battery was subjected to constant-current discharge of 0.5 C (discharge end voltage: 3.0 V, which is also applied hereinafter), and the obtained discharge capacity (mAh) was defined as a 0.5 C capacity before a storage test. After that, the battery was charged under the same conditions as those of the measurement methods (I) and (II) of a battery capacity and stored in a thermostatic oven set to 85° C. for 24 hours. The battery was taken out from the thermostatic oven and left to stand at room temperature for 3 hours. After that, the battery was subjected to constant-current discharge of 0.5 C. Then, the battery was charged under the same conditions as those of the measurement methods (I) and (II) of a battery capacity and subjected to constant-current discharge of 0.5 C. The obtained discharge capacity (mAh) was defined as a 0.5 C capacity after the storage test. From those results, a capacity recovery ratio at 0.5 C after the storage test with respect to the 0.5 C capacity before the storage test was obtained by the following expression.

Capacity recovery ratio(%)=100×{(0.5 C capacity after storage test)/(0.5 C capacity before storage test)}

The capacity recovery ratio measured at a time of charge by the method (I) is expressed as a capacity recovery ratio (I) (%) in Table 2, and the capacity recovery ratio measured at a time of charge by the method (II) is expressed as a capacity recovery ratio (II) (%) in Table 3.

<Charge and Discharge Cycle Characteristics>

After each battery was subjected to initial charge and discharge, the battery was repeatedly subjected to charge and discharge, with a series of operations of charge and discharge under the same conditions as those of the measurement methods (I) and (II) of a battery capacity being one cycle. The number of cycles performed when a discharge capacity reached 80% of the discharge capacity obtained in the first cycle was checked.

The number of cycles performed at a time of charge by the method (I) is expressed as a cycle number for reaching a capacity of 80% (I) (%) in Table 2, and the number of cycles performed at a time of charge by the method (II) is expressed as a cycle number for reaching a capacity of 80% (II) (%) in Table 3.

Next, each battery checked for the number of cycles was further repeatedly subjected to charge and discharge under the same condition as that of the measurement method (I) of a battery capacity until a discharge capacity reached 50% of the discharge capacity obtained in the first cycle. After that, each lithium secondary battery was decomposed and a positive electrode was taken out therefrom. The positive electrode was washed with dimethyl carbonate and dried, and then analyzed for a composition through use of the above-mentioned ICP method (calibration curve method). From the obtained results, the composition of a positive active material was derived, and a molar ratio (Ni/Li ratio) of the total nickel amount with respect to the total lithium amount in the entire positive active material was calculated from the above-mentioned Expression (3). The molar ratio thus calculated is shown in Table 2.

TABLE 1

|  | Kind of Li-containing composite oxide containing Ni | Mass ratio of Li-containing composite oxide containing Ni | Mass ratio of $LiCoO_2$ | Ni/Li ratio | Content of phosphonoacetate-based compound (mass %) |
|---|---|---|---|---|---|
| Example 1 | A | 0.5 | 0.5 | 0.297 | 1.0 |
| Example 2 | A | 0.8 | 0.2 | 0.472 | 3.0 |
| Example 3 | A | 0.6 | 0.4 | 0.356 | 3.0 |
| Example 4 | A | 0.4 | 0.6 | 0.238 | 2.0 |
| Example 5 | A | 0.2 | 0.8 | 0.120 | 2.0 |
| Example 6 | B | 0.5 | 0.5 | 0.443 | 5.0 |
| Example 7 | C | 1.0 | 0.0 | 0.294 | 1.0 |
| Example 8 | A | 0.1 | 0.9 | 0.060 | 0.5 |
| Example 9 | A | 0.5 | 0.5 | 0.297 | 1.0 |
| Example 10 | A | 0.5 | 0.5 | 0.297 | 1.0 |
| Example 11 | B | 0.2 | 0.8 | 0.178 | 0.5 |
| Example 12 | B | 0.2 | 0.8 | 0.178 | 1.0 |
| Example 13 | B | 0.2 | 0.8 | 0.178 | 5.0 |
| Example 14 | B | 0.5 | 0.5 | 0.443 | 1.0 |
| Example 15 | B | 0.2 | 0.8 | 0.178 | 1.0 |
| Example 16 | B | 0.2 | 0.8 | 0.178 | 1.0 |
| Comparative Example 1 | — | 0.0 | 1.0 | 0.000 | 1.0 |
| Comparative Example 2 | A | 0.5 | 0.5 | 0.297 | 0.3 |
| Comparative Example 3 | A | 0.5 | 0.5 | 0.297 | 0.0 |
| Comparative Example 4 | B | 0.2 | 0.8 | 0.178 | 0.3 |
| Comparative Example 5 | B | 0.2 | 0.8 | 0.178 | 7.0 |
| Comparative Example 6 | B | 0.5 | 0.5 | 0.443 | 0.0 |
| Comparative Example 7 | B | 0.2 | 0.8 | 0.178 | 0.0 |

TABLE 2

|  | Relative battery capacity (I) (%) | Battery swelling ratio (I) (%) | Capacity recovery ratio (I) (%) | Cycle number for reaching capacity of 80% (I) | Ni/Li ratio after 50% discharge |
|---|---|---|---|---|---|
| Example 1 | 100 | 5 | 87 | 500 | 0.594 |
| Example 2 | 140 | 6 | 85 | 490 | 0.945 |
| Example 3 | 120 | 5 | 86 | 500 | 0.711 |
| Example 4 | 98 | 4 | 88 | 510 | 0.476 |
| Example 5 | 96 | 4 | 88 | 510 | 0.239 |
| Example 6 | 130 | 6 | 86 | 490 | 0.886 |
| Example 7 | 110 | 7 | 86 | 490 | 0.588 |
| Example 8 | 95 | 7 | 85 | 500 | 0.120 |
| Example 9 | 92 | 7 | 85 | 480 | 0.594 |

TABLE 2-continued

| | Relative battery capacity (I) (%) | Battery swelling ratio (I) (%) | Capacity recovery ratio (I) (%) | Cycle number for reaching capacity of 80% (I) | Ni/Li ratio after 50% discharge |
|---|---|---|---|---|---|
| Example 10 | 98 | 6 | 85 | 490 | 0.594 |
| Example 11 | 106 | 6 | 89 | 590 | 0.356 |
| Example 12 | 104 | 4 | 87 | 600 | 0.356 |
| Example 13 | 100 | 3 | 84 | 520 | 0.356 |
| Example 14 | 130 | 4 | 87 | 600 | 0.886 |
| Example 15 | 104 | 5 | 86 | 550 | 0.356 |
| Example 16 | 93 | 6 | 88 | 580 | 0.356 |
| Comparative Example 1 | 88 | 4 | 87 | 500 | 0.000 |
| Comparative Example 2 | 98 | 10 | 78 | 450 | 0.594 |
| Comparative Example 3 | 98 | 14 | 77 | 450 | 0.594 |
| Comparative Example 4 | 106 | 10 | 83 | 590 | 0.356 |
| Comparative Example 5 | 104 | 3 | 79 | 450 | 0.356 |
| Comparative Example 6 | 130 | 16 | 70 | 410 | 0.886 |
| Comparative Example 7 | 94 | 12 | 86 | 560 | 0.356 |

TABLE 3

| | Relative battery capacity (II) (%) | Battery swelling ratio (II) (%) | Capacity recovery ratio (II) (%) | Cycle number for reaching capacity of 80% (II) |
|---|---|---|---|---|
| Example 1 | 107 | 6 | 85 | 470 |
| Example 2 | 150 | 7 | 83 | 460 |
| Example 3 | 128 | 6 | 84 | 470 |
| Example 4 | 105 | 5 | 86 | 480 |
| Example 5 | 103 | 5 | 86 | 480 |
| Example 6 | 139 | 7 | 84 | 460 |
| Example 7 | 118 | 8 | 84 | 460 |
| Example 8 | 102 | 8 | 83 | 470 |
| Example 9 | 98 | 8 | 83 | 450 |
| Example 10 | 105 | 7 | 83 | 460 |
| Example 11 | 113 | 7 | 87 | 580 |
| Example 12 | 111 | 5 | 85 | 590 |
| Example 13 | 108 | 4 | 82 | 510 |
| Example 14 | 139 | 5 | 85 | 590 |
| Example 15 | 111 | 6 | 84 | 530 |
| Example 16 | 100 | 7 | 86 | 570 |
| Comparative Example 1 | 94 | 5 | 85 | 470 |
| Comparative Example 2 | 105 | 11 | 76 | 420 |
| Comparative Example 3 | 105 | 15 | 75 | 410 |
| Comparative Example 4 | 113 | 11 | 81 | 560 |
| Comparative Example 5 | 111 | 4 | 77 | 440 |
| Comparative Example 6 | 139 | 17 | 68 | 370 |
| Comparative Example 7 | 101 | 13 | 84 | 540 |

It is understood from Tables 1, 2, and 3 that the lithium secondary battery of the present invention containing at least a lithium-containing composite oxide containing nickel having a molar ratio of a total nickel amount with respect to a total lithium amount in a total positive active material of 0.05 to 1.0, and containing 0.5 to 5.0 mass % of a phosphonoacetate-based compound as a nonaqueous electrolytic solution has a high capacity, swells less after being stored at high temperature, has a high capacity recovery ratio, and exhibits satisfactory cycle characteristics.

DESCRIPTION OF REFERENCE NUMERALS 1 positive electrode
2 negative electrode
3 separator
4 outer can
5 insulator
6 wound electrode body
7 positive electrode lead
8 negative electrode lead
9 cover plate 10 insulating packing
11 terminal
12 insulator
13 lead plate
14 nonaqueous electrolytic solution injection port
15 cleavage vent

The invention claimed is:

1. A lithium secondary battery, comprising: a positive electrode; a negative electrode; a nonaqueous electrolytic solution; and a separator,
wherein the positive electrode includes a collector and a positive electrode material mixture layer formed on the collector,
the positive electrode material mixture layer includes a positive active material, a conductive agent, and a binder,
the positive active material contains a lithium-containing composite oxide containing nickel,
wherein a molar ratio of a total nickel amount with respect to a total lithium amount contained in the entire positive active material is 0.05 to 1.0, and
the nonaqueous electrolytic solution contains 0.5 to 5.0 mass % of a phosphonoacetate-based compound represented by the following General Formula (1):

[Chem. 1]

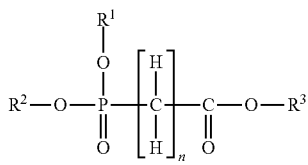

(1)

in the General Formula (1), $R^1$ and $R^2$ independently represent an alkyl group, an alkenyl group, or an alkynyl group having 1 to 12 carbon atoms, which may be substituted by a halogen atom, $R^3$ represents an alkynyl group, and "n" represents an integer of 0 to 6.

2. The lithium secondary battery according to claim 1, wherein the lithium-containing composite oxide is represented by a general composition formula: $Li_{1+y}MO_2$,
in the general composition formula, "y" satisfies a relationship: $-0.15 \leq y \leq 0.15$, and "M" represents an element group including Ni, Co, and Mn, and
the following relationships: $25 \leq a \leq 90$, $5 \leq b \leq 35$, $5 \leq c \leq 35$, and $10 \leq b+c \leq 70$ are satisfied, where a (mol %), b (mol %), and c (mol %) respectively represent a ratio of the number of elements of Ni, Co, and Mn included in the element group M with respect to the total number of elements included in the element group M.

3. The lithium secondary battery according to claim 1, wherein the positive active material further contains another lithium-containing composite oxide containing a transition metal other than nickel.

4. The lithium secondary battery according to claim 3, wherein the molar ratio is 0.15 to 1.0.

5. The lithium secondary battery according to claim 1, wherein the positive active material contains the lithium-containing composite oxide containing nickel in a ratio of 10 to 80 mass %.

6. The lithium secondary battery according to claim 1, wherein the positive electrode material mixture layer has a density of 3.7 $g/cm^3$ or more.

7. The lithium secondary battery according to claim 1, wherein the positive electrode material mixture layer contains carbon fibers having an average fiber length of 10 to 1000 nm and an average fiber diameter of 1 to 100 nm as the conductive agent.

8. The lithium secondary battery according to claim 1, wherein the positive electrode material mixture layer contains polyvinylidene fluoride and a tetrafluoroethylene-vinylidenefluoride copolymer as the binder.

9. The lithium secondary battery according to claim 1, wherein the negative electrode includes a collector and a negative electrode material mixture layer formed on the collector,
the negative electrode material mixture layer contains a negative active material, and
the negative active material contains a composite of a material containing silicon and oxygen as constituent elements and a carbon material.

10. The lithium secondary battery according to claim 9, wherein the negative active material further contains a graphitic carbon material.

11. The lithium secondary battery according to claim 1, wherein a charge voltage is 4.3 V or more.

12. The lithium secondary battery according to claim 1, wherein the phosphonoacetate-based compound is 2-propynyl(diethylphosphono)acetate.

13. The lithium secondary battery according to claim 1, wherein the separator includes a porous layer (I) containing a resin having a melting point of 140° C. or less as a main component, and a porous layer (II) containing a resin that is not melted at a temperature of 150° C. or less or an inorganic filler having a heat-resistant temperature of 150° C. or more as a main component.

14. The lithium secondary battery according to claim 1, wherein a charge voltage is 4.35 V or more.

* * * * *